US012651529B1

(12) United States Patent
Malik et al.

(10) Patent No.: US 12,651,529 B1
(45) Date of Patent: Jun. 9, 2026

(54) CONTEXT-SENSITIVE SAFETY EVENT GENERATION AND PROCESSING FOR VEHICLES

(71) Applicant: Samsara Inc., San Francisco, CA (US)

(72) Inventors: Rajiv Malik, San Jose, CA (US); Karthik Subramaniam, Chandler, AZ (US)

(73) Assignee: Samsara Inc., San Francisco, CA (US)

( * ) Notice: Subject to any disclaimer, the term of this patent is extended or adjusted under 35 U.S.C. 154(b) by 224 days.

(21) Appl. No.: 18/539,891

(22) Filed: Dec. 14, 2023

Related U.S. Application Data

(60) Provisional application No. 63/500,215, filed on May 4, 2023.

(51) Int. Cl.

| | |
|---|---|
| ***G08G 1/00*** | (2006.01) |
| ***G08G 1/01*** | (2006.01) |
| ***G08G 1/04*** | (2006.01) |
| ***G08G 1/16*** | (2006.01) |

(52) U.S. Cl.

CPC ............ *G08G 1/0133* (2013.01); *G08G 1/04* (2013.01); *G08G 1/164* (2013.01); *G08G 1/166* (2013.01)

(58) Field of Classification Search

CPC ........ G08G 1/0133; G08G 1/04; G08G 1/164; G08G 1/166; G08G 1/00

USPC ........................................................ 701/117

See application file for complete search history.

(56) References Cited

U.S. PATENT DOCUMENTS 4,671,111 A 6/1987 Lemelson
5,825,283 A 10/1998 Camhi
5,917,433 A 6/1999 Keillor et al.
6,064,299 A 5/2000 Lesesky et al.
6,098,048 A 8/2000 Dashefsky et al.
(Continued)

FOREIGN PATENT DOCUMENTS

CN 111047179 A 4/2020
DE 10 2004 015 221 A1 10/2005
(Continued)

OTHER PUBLICATIONS

US 11,450,210 B2, 09/2022, Tsai et al. (withdrawn)
(Continued)

*Primary Examiner* — Shardul D Patel

(74) *Attorney, Agent, or Firm* — Knobbe, Martens, Olson & Bear, LLP

(57) ABSTRACT

A method can include receiving, from a safety monitoring device on a vehicle, a raw event. The method can include receiving contextual information associated with the raw event, selecting rules to apply to the raw event, and applying the rules to the raw event. The method can include determining a pre-safety event, selecting, based on the pre-safety event and/or the contextual information, vendor safety event rules and customer safety event rules, determining a conflict between a customer safety event rule and a vendor safety event rule, and applying the vendor safety event rules and the customer safety event rules to the pre-safety event and the contextual information to determine a safety event, wherein the conflicting vendor safety event rule is not applied. The method can include making safety event information available to a user, receiving feedback from the user, and updating a safety event rule engine based on the feedback.

19 Claims, 9 Drawing Sheets

(56) References Cited

U.S. PATENT DOCUMENTS

| | | | |
|---|---|---|---|
| 6,157,864 | A | 12/2000 | Schwenke et al. |
| 6,253,129 | B1 | 6/2001 | Jenkins et al. |
| 6,317,668 | B1 | 11/2001 | Thibault et al. |
| 6,411,203 | B1 | 6/2002 | Lesesky et al. |
| 6,421,590 | B2 | 7/2002 | Thibault |
| 6,452,487 | B1 | 9/2002 | Krupinski |
| 6,505,106 | B1 | 1/2003 | Lawrence et al. |
| 6,651,063 | B1 | 11/2003 | Vorobiev |
| 6,714,894 | B1 | 3/2004 | Tobey et al. |
| 6,718,239 | B2 | 4/2004 | Rayner |
| 6,741,165 | B1 | 5/2004 | Langfahl et al. |
| 6,801,920 | B1 | 10/2004 | Wischinski |
| 7,117,075 | B1 | 10/2006 | Larschan et al. |
| 7,139,780 | B2 | 11/2006 | Lee et al. |
| 7,209,959 | B1 | 4/2007 | Campbell et al. |
| 7,233,684 | B2 | 6/2007 | Fedorovskaya et al. |
| 7,386,376 | B2 | 6/2008 | Basir et al. |
| 7,389,178 | B2 | 6/2008 | Raz et al. |
| 7,398,298 | B2 | 7/2008 | Koch |
| 7,492,938 | B2 | 2/2009 | Brinson, Jr. et al. |
| 7,526,103 | B2 | 4/2009 | Schofield et al. |
| 7,555,378 | B2 | 6/2009 | Larschan et al. |
| 7,596,417 | B2 | 9/2009 | Fister et al. |
| 7,606,779 | B2 | 10/2009 | Brinson, Jr. et al. |
| 7,715,961 | B1 | 5/2010 | Kargupta |
| 7,769,499 | B2 | 8/2010 | McQuade et al. |
| 7,844,088 | B2 | 11/2010 | Brinson, Jr. et al. |
| 7,859,392 | B2 | 12/2010 | McClellan et al. |
| 7,877,198 | B2 | 1/2011 | Tenzer et al. |
| 7,881,838 | B2 | 2/2011 | Larschan et al. |
| 7,957,936 | B2 | 6/2011 | Eryurek et al. |
| 8,019,581 | B2 | 9/2011 | Sheha et al. |
| 8,024,311 | B2 | 9/2011 | Wood et al. |
| 8,032,277 | B2 | 10/2011 | Larschan et al. |
| 8,140,358 | B1 | 3/2012 | Ling et al. |
| 8,156,108 | B2 | 4/2012 | Middleton et al. |
| 8,156,499 | B2 | 4/2012 | Foulger et al. |
| 8,169,343 | B2 | 5/2012 | Sheha et al. |
| 8,175,992 | B2 | 5/2012 | Bass, II et al. |
| 8,230,272 | B2 | 7/2012 | Middleton et al. |
| 8,260,489 | B2 | 9/2012 | Nielsen et al. |
| 8,417,402 | B2 | 4/2013 | Basir |
| 8,442,508 | B2 | 5/2013 | Harter et al. |
| 8,457,395 | B2 | 6/2013 | Boncyk et al. |
| 8,509,412 | B2 | 8/2013 | Sheha et al. |
| 8,543,625 | B2 | 9/2013 | Middleton et al. |
| 8,560,164 | B2 | 10/2013 | Nielsen et al. |
| 8,615,555 | B2 | 12/2013 | Koch |
| 8,625,885 | B2 | 1/2014 | Brinson, Jr. et al. |
| 8,626,568 | B2 | 1/2014 | Warkentin et al. |
| 8,633,672 | B2 | 1/2014 | Jung et al. |
| 8,669,857 | B2 | 3/2014 | Sun et al. |
| 8,682,572 | B2 | 3/2014 | Raz et al. |
| 8,706,409 | B2 | 4/2014 | Mason et al. |
| 8,831,825 | B2 | 9/2014 | Shah et al. |
| 8,836,784 | B2 | 9/2014 | Erhardt et al. |
| 8,918,229 | B2 | 12/2014 | Hunt et al. |
| 8,953,228 | B1 | 2/2015 | Mehers |
| 8,989,914 | B1 | 3/2015 | Nemat-Nasser et al. |
| 8,989,959 | B2 | 3/2015 | Plante et al. |
| 8,996,240 | B2 | 3/2015 | Plante |
| 9,024,744 | B2 | 5/2015 | Klose et al. |
| 9,053,590 | B1 | 6/2015 | Kator et al. |
| 9,137,498 | B1 | 9/2015 | L'Heureux et al. |
| 9,147,335 | B2 | 9/2015 | Raghunathan et al. |
| 9,152,609 | B2 | 10/2015 | Schwartz et al. |
| 9,165,196 | B2 | 10/2015 | Kesavan et al. |
| 9,170,913 | B2 | 10/2015 | Hunt et al. |
| 9,189,895 | B2 | 11/2015 | Phelan et al. |
| 9,230,250 | B1 | 1/2016 | Parker et al. |
| 9,230,437 | B2 | 1/2016 | Brinton et al. |
| 9,280,435 | B2 | 3/2016 | Hunt et al. |
| 9,311,271 | B2 | 4/2016 | Wright |
| 9,344,683 | B1 | 5/2016 | Nemat-Nasser et al. |
| 9,349,228 | B2 | 5/2016 | Ochsendorf et al. |
| 9,384,111 | B2 | 7/2016 | Hunt et al. |
| 9,389,147 | B1 | 7/2016 | Lambert et al. |
| 9,402,060 | B2 | 7/2016 | Plante |
| 9,412,282 | B2 | 8/2016 | Hunt et al. |
| 9,439,280 | B2 | 9/2016 | Chang et al. |
| 9,445,270 | B1 | 9/2016 | Bicket et al. |
| 9,477,639 | B2 | 10/2016 | Fischer et al. |
| 9,477,989 | B2 | 10/2016 | Grimm et al. |
| 9,527,515 | B2 | 12/2016 | Hunt et al. |
| 9,594,725 | B1 | 3/2017 | Cook et al. |
| 9,672,667 | B2 | 6/2017 | Mason et al. |
| 9,688,282 | B2 | 6/2017 | Cook et al. |
| 9,728,015 | B2 | 8/2017 | Kwak |
| 9,761,063 | B2 | 9/2017 | Lambert et al. |
| 9,761,067 | B2 | 9/2017 | Plante et al. |
| 9,811,536 | B2 | 11/2017 | Morris et al. |
| 9,818,088 | B2 | 11/2017 | Penilla et al. |
| 9,846,979 | B1 | 12/2017 | Sainaney et al. |
| 9,849,834 | B2 | 12/2017 | Reed et al. |
| 9,852,625 | B2 | 12/2017 | Victor et al. |
| 9,892,376 | B2 | 2/2018 | Pfeiffer et al. |
| 9,922,567 | B2 | 3/2018 | Molin et al. |
| 9,934,628 | B2 | 4/2018 | Kreiner et al. |
| 9,996,980 | B1 | 6/2018 | Gonzalez et al. |
| 10,015,452 | B1 | 7/2018 | Schofield et al. |
| 10,033,706 | B2 | 7/2018 | Bicket et al. |
| 10,040,459 | B1 | 8/2018 | Kukreja |
| 10,065,652 | B2 | 9/2018 | Shenoy et al. |
| 10,068,392 | B2 | 9/2018 | Cook et al. |
| 10,075,669 | B2 | 9/2018 | Vanman et al. |
| 10,083,547 | B1 | 9/2018 | Tomatsu |
| 10,085,149 | B2 | 9/2018 | Bicket et al. |
| 10,094,308 | B2 | 10/2018 | Kolhouse et al. |
| 10,102,495 | B1 | 10/2018 | Zhang et al. |
| 10,127,810 | B2 | 11/2018 | Durie, Jr. et al. |
| 10,157,321 | B2 | 12/2018 | Becker et al. |
| 10,173,486 | B1 | 1/2019 | Lee et al. |
| 10,173,544 | B2 | 1/2019 | Hendrix et al. |
| 10,196,071 | B1 | 2/2019 | Rowson et al. |
| 10,206,107 | B2 | 2/2019 | Bicket et al. |
| 10,223,935 | B2 | 3/2019 | Sweany et al. |
| 10,275,959 | B2 | 4/2019 | Ricci |
| 10,286,875 | B2 | 5/2019 | Penilla et al. |
| 10,290,036 | B1 | 5/2019 | Gella et al. |
| 10,311,749 | B1 | 6/2019 | Kypri et al. |
| 10,336,190 | B2 | 7/2019 | Yokochi et al. |
| 10,388,075 | B2 | 8/2019 | Schmirler et al. |
| 10,389,739 | B2 | 8/2019 | Solotorevsky |
| 10,390,227 | B2 | 8/2019 | Bicket et al. |
| 10,444,949 | B2 | 10/2019 | Scott et al. |
| 10,445,559 | B2 | 10/2019 | Joseph et al. |
| 10,459,444 | B1 | 10/2019 | Kentley-Klay |
| 10,460,183 | B2 | 10/2019 | Welland et al. |
| 10,460,600 | B2 | 10/2019 | Julian et al. |
| 10,471,955 | B2 | 11/2019 | Kouri et al. |
| 10,486,709 | B1 | 11/2019 | Mezaael |
| 10,489,222 | B2 | 11/2019 | Sathyanarayana et al. |
| 10,523,904 | B2 | 12/2019 | Mahmoud et al. |
| 10,573,183 | B1 | 2/2020 | Li et al. |
| 10,579,123 | B2 | 3/2020 | Tuan et al. |
| 10,609,114 | B1 | 3/2020 | Bicket et al. |
| 10,621,873 | B1 | 4/2020 | Spiel et al. |
| 10,623,899 | B2 | 4/2020 | Watkins et al. |
| 10,632,941 | B2 | 4/2020 | Chauncey et al. |
| 10,652,335 | B2 | 5/2020 | Botticelli |
| 10,715,976 | B2 | 7/2020 | Hoffner et al. |
| 10,762,363 | B2 | 9/2020 | Watanabe |
| 10,782,691 | B2 | 9/2020 | Suresh et al. |
| 10,788,990 | B2 | 9/2020 | Kim et al. |
| 10,789,840 | B2 | 9/2020 | Boykin et al. |
| 10,803,496 | B1 | 10/2020 | Hopkins |
| 10,818,109 | B2 | 10/2020 | Palmer et al. |
| 10,827,324 | B1 | 11/2020 | Hajimiri et al. |
| 10,843,659 | B1 | 11/2020 | Innocenzi et al. |
| 10,848,670 | B2 | 11/2020 | Gatti et al. |
| 10,878,030 | B1 | 12/2020 | Lambert et al. |
| 10,969,852 | B2 | 4/2021 | Tuan et al. |
| 10,979,871 | B2 | 4/2021 | Hajimiri et al. |
| 10,999,269 | B2 | 5/2021 | Bicket et al. |

(56) References Cited

U.S. PATENT DOCUMENTS

| | | | |
|---|---|---|---|
| 10,999,374 | B2 | 5/2021 | ElHattab et al. |
| 11,046,205 | B1 | 6/2021 | Govan et al. |
| 11,069,257 | B2 | 7/2021 | Palmer et al. |
| 11,080,568 | B2 | 8/2021 | ElHattab et al. |
| 11,122,488 | B1 | 9/2021 | Lloyd et al. |
| 11,126,910 | B1 | 9/2021 | Akhtar et al. |
| 11,127,130 | B1 | 9/2021 | Jain et al. |
| 11,131,986 | B1 | 9/2021 | Gal et al. |
| 11,132,853 | B1 | 9/2021 | Akhtar et al. |
| 11,137,744 | B1 | 10/2021 | Heddleston et al. |
| 11,142,175 | B2 | 10/2021 | Chow et al. |
| 11,158,177 | B1 | 10/2021 | ElHattab et al. |
| 11,184,422 | B1 | 11/2021 | Bicket et al. |
| 11,188,046 | B1 | 11/2021 | ElHattab et al. |
| 11,190,373 | B1 | 11/2021 | Stevenson et al. |
| 11,204,637 | B2 | 12/2021 | Tuan et al. |
| 11,260,878 | B2 | 3/2022 | Palmer et al. |
| 11,341,786 | B1 | 5/2022 | Calmer et al. |
| 11,349,901 | B1 | 5/2022 | Duffield et al. |
| 11,352,013 | B1 | 6/2022 | Srinivasan et al. |
| 11,352,014 | B1 | 6/2022 | Srinivasan et al. |
| 11,356,605 | B1 | 6/2022 | Shemet et al. |
| 11,356,909 | B1 | 6/2022 | Lloyd |
| 11,365,980 | B1 | 6/2022 | Akhtar et al. |
| 11,386,325 | B1 | 7/2022 | Srinivasan et al. |
| 11,436,844 | B2 | 9/2022 | Carruthers et al. |
| 11,451,610 | B1 | 9/2022 | Saunders et al. |
| 11,451,611 | B1 | 9/2022 | Saunders et al. |
| 11,460,507 | B2 | 10/2022 | Lloyd et al. |
| 11,464,079 | B1 | 10/2022 | Aschenbener et al. |
| 11,479,142 | B1 | 10/2022 | Govan et al. |
| 11,494,921 | B2 | 11/2022 | ElHattab et al. |
| 11,522,857 | B1 | 12/2022 | Symons et al. |
| 11,532,169 | B1 | 12/2022 | Hassan et al. |
| 11,558,449 | B1 | 1/2023 | Bicket et al. |
| 11,595,632 | B2 | 2/2023 | Tsai et al. |
| 11,599,097 | B1 | 3/2023 | Gal et al. |
| 11,606,736 | B1 | 3/2023 | Lloyd et al. |
| 11,611,621 | B2 | 3/2023 | ElHattab et al. |
| 11,615,141 | B1 | 3/2023 | Hoye et al. |
| 11,620,909 | B2 | 4/2023 | Tsai et al. |
| 11,627,252 | B2 | 4/2023 | Delegard et al. |
| 11,641,388 | B1 | 5/2023 | Saunders et al. |
| 11,641,604 | B1 | 5/2023 | Lloyd |
| 11,643,102 | B1 | 5/2023 | Calmer et al. |
| 11,659,060 | B2 | 5/2023 | Davis et al. |
| 11,665,223 | B1 | 5/2023 | Duffield et al. |
| 11,669,714 | B1 | 6/2023 | Akhtar et al. |
| 11,671,478 | B1 | 6/2023 | Saunders et al. |
| 11,674,813 | B1 | 6/2023 | Chung et al. |
| 11,675,042 | B1 | 6/2023 | Lloyd et al. |
| 11,683,579 | B1 | 6/2023 | Symons et al. |
| 11,688,211 | B1 | 6/2023 | Calmer et al. |
| 11,694,317 | B1 | 7/2023 | Jain et al. |
| 11,704,984 | B1 | 7/2023 | ElHattab et al. |
| 11,709,500 | B2 | 7/2023 | Lloyd et al. |
| 11,710,409 | B2 | 7/2023 | Nanda et al. |
| 11,720,087 | B1 | 8/2023 | Heddleston et al. |
| 11,727,054 | B2 | 8/2023 | Grandhi et al. |
| 11,731,469 | B1 | 8/2023 | McGillan |
| 11,736,312 | B1 | 8/2023 | Xiao et al. |
| 11,741,760 | B1 | 8/2023 | Dubin et al. |
| 11,748,377 | B1 | 9/2023 | Zhang et al. |
| 11,752,895 | B1 | 9/2023 | Govan et al. |
| 11,756,346 | B1 | 9/2023 | Wu et al. |
| 11,756,351 | B1 | 9/2023 | Akhtar et al. |
| 11,758,096 | B2 | 9/2023 | Shah et al. |
| 11,776,328 | B2 | 10/2023 | Yang et al. |
| 11,780,446 | B1 | 10/2023 | Srinivasan et al. |
| 11,782,930 | B2 | 10/2023 | McGee et al. |
| 11,787,413 | B2 | 10/2023 | Tsai et al. |
| 11,798,187 | B2 | 10/2023 | Zaheer et al. |
| 11,798,298 | B2 | 10/2023 | Hassan et al. |
| 11,800,317 | B1 | 10/2023 | Dugar et al. |
| 11,838,884 | B1 | 12/2023 | Dergosits et al. |
| 11,842,577 | B1 | 12/2023 | Harrison et al. |
| 11,847,911 | B2 | 12/2023 | ElHattab et al. |
| 11,855,801 | B1 | 12/2023 | Stevenson et al. |
| 11,861,955 | B1 | 1/2024 | Dubin et al. |
| 11,863,712 | B1 | 1/2024 | Young et al. |
| 11,866,055 | B1 | 1/2024 | Srinivasan et al. |
| 11,868,919 | B1 | 1/2024 | Zhang et al. |
| 11,875,580 | B2 | 1/2024 | Hassan et al. |
| 11,875,683 | B1 | 1/2024 | Tsai et al. |
| 11,890,962 | B1 | 2/2024 | Govan et al. |
| 11,937,152 | B2 | 3/2024 | Hajimiri et al. |
| 11,938,948 | B1 | 3/2024 | Davis et al. |
| 11,959,772 | B2 | 4/2024 | Robbins et al. |
| 11,974,410 | B1 | 4/2024 | Lin et al. |
| 11,975,685 | B1 | 5/2024 | Innocenzi et al. |
| 11,989,001 | B1 | 5/2024 | ElHattab et al. |
| 11,995,546 | B1 | 5/2024 | Srinivasan et al. |
| 11,997,181 | B1 | 5/2024 | Davis et al. |
| 12,000,940 | B1 | 6/2024 | Lloyd et al. |
| 12,106,613 | B2 | 10/2024 | Calmer et al. |
| 12,117,546 | B1 | 10/2024 | Lloyd et al. |
| 12,126,917 | B1 | 10/2024 | Shemet et al. |
| 12,128,919 | B2 | 10/2024 | Calmer et al. |
| 12,140,445 | B1 | 11/2024 | Akhtar et al. |
| 12,150,186 | B1 | 11/2024 | Aguilar et al. |
| 12,165,360 | B1 | 12/2024 | Jain et al. |
| 12,168,445 | B1 | 12/2024 | Srinivasan et al. |
| 12,172,653 | B1 | 12/2024 | Akhtar et al. |
| 12,179,629 | B1 | 12/2024 | Govan et al. |
| 12,197,610 | B2 | 1/2025 | Wen et al. |
| 12,213,090 | B1 | 1/2025 | Dergosits et al. |
| 12,228,944 | B1 | 2/2025 | Dubin et al. |
| 12,253,617 | B1 | 3/2025 | Aguilar et al. |
| 12,256,021 | B1 | 3/2025 | Torres et al. |
| 12,260,616 | B1 | 3/2025 | Rajan et al. |
| 12,269,498 | B1 | 4/2025 | Rommel et al. |
| 12,289,181 | B1 | 4/2025 | Stevenson et al. |
| 12,306,010 | B1 | 5/2025 | Rommel et al. |
| 12,327,445 | B1 | 6/2025 | Eberhardt et al. |
| 12,328,639 | B1 | 6/2025 | Smith et al. |
| 12,344,168 | B1 | 7/2025 | Wang et al. |
| 12,346,712 | B1 | 7/2025 | Eberhardt et al. |
| 12,367,718 | B1 | 7/2025 | Calmer et al. |
| 12,368,903 | B1 | 7/2025 | Lin et al. |
| 12,426,007 | B1 | 9/2025 | Aguilar et al. |
| 12,445,285 | B1 | 10/2025 | McHugh et al. |
| 12,450,329 | B1 | 10/2025 | Torres et al. |
| 12,479,446 | B1 | 11/2025 | Jurden et al. |
| 2002/0061758 | A1 | 5/2002 | Zarlengo et al. |
| 2002/0128751 | A1 | 9/2002 | Engstrom et al. |
| 2002/0169850 | A1 | 11/2002 | Batke et al. |
| 2003/0081935 | A1 | 5/2003 | Kirmuss |
| 2003/0154009 | A1 | 8/2003 | Basir et al. |
| 2004/0093264 | A1 | 5/2004 | Shimizu |
| 2004/0236476 | A1 | 11/2004 | Chowdhary |
| 2004/0236596 | A1 | 11/2004 | Chowdhary et al. |
| 2005/0131585 | A1 | 6/2005 | Luskin et al. |
| 2005/0131646 | A1 | 6/2005 | Camus |
| 2005/0286774 | A1 | 12/2005 | Porikli |
| 2006/0167591 | A1 | 7/2006 | McNally |
| 2007/0050108 | A1 | 3/2007 | Larschan et al. |
| 2007/0173991 | A1 | 7/2007 | Tenzer et al. |
| 2008/0252487 | A1 | 10/2008 | McClellan et al. |
| 2008/0319602 | A1 | 12/2008 | McClellan et al. |
| 2009/0099724 | A1 | 4/2009 | Kranz et al. |
| 2009/0141939 | A1 | 6/2009 | Chambers et al. |
| 2009/0240427 | A1 | 9/2009 | Siereveld et al. |
| 2010/0030586 | A1 | 2/2010 | Taylor et al. |
| 2010/0049639 | A1 | 2/2010 | Ferro et al. |
| 2010/0281161 | A1 | 11/2010 | Cohn et al. |
| 2011/0060496 | A1 | 3/2011 | Nielsen et al. |
| 2011/0093306 | A1 | 4/2011 | Nielsen et al. |
| 2011/0234749 | A1 | 9/2011 | Alon |
| 2011/0276265 | A1 | 11/2011 | Husain |
| 2012/0109418 | A1 | 5/2012 | Lorber |
| 2012/0194357 | A1 | 8/2012 | Ciolli |
| 2012/0201277 | A1 | 8/2012 | Tanner et al. |
| 2012/0218416 | A1 | 8/2012 | Leny et al. |
| 2012/0235625 | A1 | 9/2012 | Takehara |

(56) References Cited

U.S. PATENT DOCUMENTS

2012/0262104 A1 10/2012 Kirsch
2012/0303397 A1 11/2012 Prosser
2013/0073112 A1 3/2013 Phelan et al.
2013/0162421 A1 6/2013 Inaguma et al.
2013/0162425 A1 6/2013 Raghunathan et al.
2013/0164713 A1 6/2013 Hunt et al.
2013/0211559 A1 8/2013 Lawson et al.
2013/0244210 A1 9/2013 Nath et al.
2013/0250040 A1 9/2013 Vitsnudel et al.
2013/0332004 A1 12/2013 Gompert et al.
2014/0012492 A1 1/2014 Bowers et al.
2014/0095061 A1 4/2014 Hyde
2014/0098060 A1 4/2014 McQuade et al.
2014/0113619 A1 4/2014 Tibbitts et al.
2014/0159660 A1 6/2014 Klose et al.
2014/0195106 A1 7/2014 McQuade et al.
2014/0223090 A1 8/2014 Malone
2014/0278108 A1 9/2014 Kerrigan et al.
2014/0293069 A1 10/2014 Lazar et al.
2014/0328517 A1 11/2014 Gluncic
2014/0337429 A1 11/2014 Asenjo et al.
2014/0354227 A1 12/2014 Tyagi et al.
2014/0354228 A1 12/2014 Williams et al.
2015/0025734 A1 1/2015 Cook et al.
2015/0044641 A1 2/2015 Chauncey et al.
2015/0074091 A1 3/2015 Walkin et al.
2015/0116114 A1 4/2015 Boyles
2015/0226563 A1 8/2015 Cox et al.
2015/0283912 A1 10/2015 Shimizu et al.
2015/0347121 A1 12/2015 Harumoto
2016/0046298 A1 2/2016 DeRuyck et al.
2016/0110066 A1 4/2016 McCormick et al.
2016/0176401 A1 6/2016 Pilkington
2016/0275376 A1 9/2016 Kant
2016/0288744 A1 10/2016 Rutherford et al.
2016/0293049 A1 10/2016 Monahan et al.
2016/0343091 A1 11/2016 Han et al.
2016/0375780 A1 12/2016 Penilla et al.
2017/0039784 A1 2/2017 Gelbart et al.
2017/0060726 A1 3/2017 Glistvain
2017/0102463 A1 4/2017 Hwang
2017/0123397 A1 5/2017 Billi et al.
2017/0124476 A1 5/2017 Levinson et al.
2017/0140603 A1 5/2017 Ricci
2017/0195265 A1 7/2017 Billi et al.
2017/0200061 A1 7/2017 Julian et al.
2017/0263049 A1 9/2017 MacDonald et al.
2017/0263120 A1 9/2017 Durie, Jr. et al.
2017/0278004 A1 9/2017 McElhinney et al.
2017/0286838 A1 10/2017 Cipriani et al.
2017/0291611 A1 10/2017 Innes et al.
2017/0291800 A1 10/2017 Scoville et al.
2017/0323641 A1 11/2017 Shimizu et al.
2017/0332199 A1 11/2017 Elliott et al.
2017/0345283 A1 11/2017 Kwon et al.
2017/0366935 A1 12/2017 Ahmadzadeh et al.
2018/0001771 A1 1/2018 Park et al.
2018/0001899 A1 1/2018 Shenoy et al.
2018/0012196 A1 1/2018 Ricci et al.
2018/0025636 A1 1/2018 Boykin et al.
2018/0063576 A1 3/2018 Tillman et al.
2018/0068206 A1 3/2018 Pollach et al.
2018/0072313 A1 3/2018 Stenneth
2018/0075309 A1 3/2018 Sathyanarayana et al.
2018/0093672 A1 4/2018 Terwilliger et al.
2018/0174485 A1 6/2018 Stankoulov
2018/0234514 A1 8/2018 Rajiv et al.
2018/0247109 A1 8/2018 Joseph et al.
2018/0253109 A1 9/2018 Fontaine et al.
2018/0262724 A1 9/2018 Ross
2018/0295141 A1 10/2018 Solotorevsky
2018/0329381 A1 11/2018 Doh et al.
2018/0356800 A1 12/2018 Chao et al.
2018/0357484 A1 12/2018 Omata
2018/0364686 A1 12/2018 Naidoo et al.
2019/0003848 A1 1/2019 Hoten et al.
2019/0007690 A1 1/2019 Varadarajan et al.
2019/0054876 A1 2/2019 Ferguson et al.
2019/0065951 A1 2/2019 Luo et al.
2019/0077308 A1 3/2019 Kashchenko
2019/0118655 A1 4/2019 Grimes et al.
2019/0120947 A1 4/2019 Wheeler et al.
2019/0174158 A1 6/2019 Herrick et al.
2019/0188847 A1 6/2019 Gonzalez et al.
2019/0244301 A1 8/2019 Seth et al.
2019/0257661 A1 8/2019 Stentz et al.
2019/0265712 A1 8/2019 Satzoda et al.
2019/0272725 A1 9/2019 Viklund et al.
2019/0286948 A1 9/2019 Sathyanarayana et al.
2019/0303718 A1 10/2019 Tanigawa et al.
2019/0304082 A1 10/2019 Tokashiki et al.
2019/0318419 A1 10/2019 VanderZanden
2019/0318549 A1 10/2019 Zeira et al.
2019/0327590 A1 10/2019 Kubo et al.
2019/0327613 A1 10/2019 Bicket et al.
2019/0370581 A1 12/2019 Cordell et al.
2020/0018612 A1 1/2020 Wolcott
2020/0026282 A1 1/2020 Choe et al.
2020/0050182 A1 2/2020 Cheng et al.
2020/0074326 A1 3/2020 Balakrishnan et al.
2020/0074397 A1 3/2020 Burda et al.
2020/0139847 A1 5/2020 Baumer et al.
2020/0150739 A1 5/2020 Tuan et al.
2020/0162489 A1 5/2020 Bar-Nahum et al.
2020/0164509 A1 5/2020 Shults et al.
2020/0168094 A1 5/2020 Shimodaira et al.
2020/0283003 A1 9/2020 Raichelgauz
2020/0311602 A1 10/2020 Hawley et al.
2020/0312155 A1 10/2020 Kelkar et al.
2020/0327009 A1 10/2020 Callison et al.
2020/0327369 A1 10/2020 Cruz et al.
2020/0342230 A1 10/2020 Tsai et al.
2020/0342235 A1 10/2020 Tsai et al.
2020/0342274 A1 10/2020 ElHattab et al.
2020/0342506 A1 10/2020 Levy et al.
2020/0342611 A1 10/2020 ElHattab et al.
2020/0344301 A1 10/2020 ElHattab et al.
2020/0371773 A1 11/2020 Kato et al.
2020/0380806 A1 12/2020 Tabata
2020/0389415 A1 12/2020 Zhao et al.
2021/0006950 A1 1/2021 Hajimiri et al.
2021/0097315 A1 4/2021 Carruthers et al.
2021/0397908 A1 12/2021 ElHattab et al.
2022/0165073 A1 5/2022 Shikii et al.
2022/0262117 A1* 8/2022 Naslavsky ............. G06V 10/96
2022/0289203 A1* 9/2022 Makilya ................. G06V 20/59
2022/0374737 A1 11/2022 Dhara et al.
2023/0077207 A1 3/2023 Hassan et al.
2023/0153735 A1 5/2023 Dhara et al.
2023/0169420 A1 6/2023 Dhara et al.
2023/0219592 A1 7/2023 Calmer et al.
2023/0281553 A1 9/2023 Singh et al.
2023/0298410 A1 9/2023 Calmer et al.
2024/0003749 A1 1/2024 Lin et al.
2024/0005678 A1 1/2024 Hassan et al.
2024/0013423 A1 1/2024 Zaheer et al.
2024/0063596 A1 2/2024 Pandian et al.
2024/0146629 A1 5/2024 Lloyd
2025/0002033 A1 1/2025 Calmer et al.

FOREIGN PATENT DOCUMENTS

EP 1615178 A2 1/2006
GB 2288892 A 11/1995
WO WO 2017/123665 A1 7/2017
WO WO 2018/131322 A1 7/2018
WO WO 2019/099409 A1 5/2019
WO WO 2019/125545 A1 6/2019

(56) References Cited

FOREIGN PATENT DOCUMENTS

WO WO 2019/133533 A1 7/2019
WO WO 2023/244513 A1 12/2023

OTHER PUBLICATIONS

"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=EAlalQobChMI14DWIofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.
"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.

(56) References Cited

OTHER PUBLICATIONS

"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.

(56) References Cited

OTHER PUBLICATIONS gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.
Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.
Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.
Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.
Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.
Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

(56) References Cited

OTHER PUBLICATIONS

Motive Help Center, “What is Fuel Hub?”, Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive Help Center, “What is Fuel Hub?”, Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.
Motive Help Center, “What is Motive Fleet App?”, Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.
Motive Help Center, “What is Safety Hub?”, Motive Technologies, Inc., accessed on Oct. 24, 2023 [publication date unknown], in 10 pages. URL: https://helpcenter.gomotive.com/hc/en-us/articles/6162472353053-What-is-Safety-Hub-.
Motive Help Center, “What Motive fuel features are available?”, Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.
Motive Help Center, “What unsafe behaviors does Motive monitor through Dashcam and Vehicle Gateway?”, Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive Help Center, “What unsafe behaviors does Motive monitor through Dashcam and Vehicle Gateway?”, Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.
Motive, “AI dash cam comparison: Motive, Samsara, Lytx”, Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, “AI dash cam comparison: Motive, Samsara, Lytx”, Motive Technologies, Inc., accessed on Feb. 18, 2024 [publication date unknown], in 20 pages. URL: https://gomotive.com/products/dashcam/fleet-dash-cam-comparison/.
Motive, “Asset Gateway Installation Guide | Cable/Vehicle Powered” [video], YouTube, Jun. 25, 2020, screenshot in 1 page. URL: https://www.youtube.com/watch?v=pME-VMauQgY.
Motive, “Asset Gateway Installation Guide | Solar Powered” [video], YouTube, Jun. 25, 2020, screenshot in 1 page. URL: https://www.youtube.com/watch?v=jifKM3GT6Bs.
Motive, “Benchmarking AI Accuracy for Driver Safety” [video], YouTube, Apr. 21, 2022, screenshot in 1 page. URL: https://www.youtube.com/watch?v=brRt2h0J80E.
Motive, “CEO Shoaib Makani’s email to Motive employees.”, Motive Technologies, Inc., Dec. 7, 2022, in 5 pages. URL: https://gomotive.com/blog/shoaib-makanis-message-to-employees/.
Motive, “Coach your drivers using the Motive Safety Hub.” [video], YouTube, Mar. 27, 2023, screenshot in 1 page. URL: https://www.youtube.com/watch?v=VeErPXF30js.
Motive, “Equipment and trailer monitoring”, Motive Technologies, Inc., accessed on Feb. 18, 2024 [publication date unknown], in 11 pages. URL: https://gomotive.com/products/tracking-telematics/trailer-tracking/.
Motive, “Experts agree, Motive is the most accurate, fastest AI dash cam.”, Motive Technologies, Inc., accessed Feb. 21, 2024 [publication date unknown] in 16 pages. URL: https://gomotive.com/products/dashcam/best-dash-cam/.
Motive, “Guide: DRIVE risk score”, Motive Technologies, Inc., accessed on Apr. 8, 2023 [publication date unknown], Document No. 2022Q2_849898994, in 22 pages.
Motive, “Guide: Smart Event Thresholds”, Motive Technologies, Inc., accessed on Apr. 8, 2023 [publication date unknown], Document No. 2022Q1_902914404, in 11 pages.
Motive, “How to install a Motive Vehicle Gateway in light-duty vehicles.” [video], YouTube, Aug. 5, 2022, screenshot in 1 page. URL: https://www.youtube.com/watch?v=WnclRs_cFw0.
Motive, “How to install your Motive AI Dashcam.” [video], YouTube, Aug. 5, 2022, screenshot in 1 page. URL: https://www.youtube.com/watch?v=3JNG2h3KnU4.
Motive, “IFTA fuel tax reporting”, Motive Technologies, Inc., accessed on Feb. 18, 2024 [publication date unknown], in 4 pages. URL: https://gomotive.com/products/fleet-compliance/ifta-fuel-tax-reporting/.
Motive, “Improve road and fleet safety with driver scores.”, Motive Technologies, Inc., Feb. 7, 2019, in 5 pages. URL: https://gomotive.com/blog/improve-fleet-safety-driver-scores/.
Motive, “Industry-leading fleet management solutions”, Motive Technologies, Inc., accessed on Feb. 18, 2024 [publication date unknown], in 13 pages. URL: https://gomotive.com/products/.
Motive, “Introducing an easier way to manage unidentified trips.”, Motive Technologies, Inc., Apr. 30, 2020, in 5 pages. URL: https://gomotive.com/blog/introducing-easier-ude-management/.
Motive, “Introducing Motive Driver Workflow.”, Motive Technologies, Inc., Oct. 16, 2017, in 5 pages. URL: https://gomotive.com/blog/motive-driver-workflow/.
Motive, “Introducing the Motive Asset Gateway and dual-facing Smart Dashcam.”, Motive Technologies, Inc., Sep. 9, 2019, in 5 pages. URL: https://gomotive.com/blog/trailer-tracking-and-dual-facing-dash-cam-introducing/.
Motive, “Introducing the Motive Smart Dashcam”, Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, “KeepTruckin ELD Training for Drivers” [video], YouTube, Feb. 2, 2018, screenshot in 1 page. URL: https://www.youtube.com/watch?v=LKJLIT2bGS0.
Motive, “KeepTruckin Smart Dashcam” [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, “Motive Fleet View | Advanced GPS system for live and historical fleet tracking.” [video], YouTube, Jan. 23, 2023, screenshot in 1 page. URL: https://www.youtube.com/watch?v=CSDiDZhjVOQ.
Motive, “Motive introduces Reefer Monitoring for cold chain logistics.”, Motive Technologies, Inc., Oct. 4, 2022, in 5 pages. URL: https://gomotive.com/blog/motive-introduces-reefer-monitoring-for-cold-chain-logistics/.
Motive, “Motive Reefer Monitoring for cold chain logistics.” [video], YouTube, Oct. 5, 2022, screenshot in 1 page. URL: https://www.youtube.com/watch?v=rDwS5AmQp-M.
Motive, “Motive Smart Load Board—designed to help you find the right loads faster.” [video], YouTube, Nov. 28, 2022, screenshot in 1 page. URL: https://www.youtube.com/watch?v=UF2EQBzLYYk.
Motive, “Motive vs. Samsara: What’s the difference?”, Motive Technologies, Inc., accessed Feb. 21, 2024 [publication date unknown], in 16 pages. URL: https://gomotive.com/motive-vs-samsara/#compare-chart.
Motive, “No time for downtime—automate fleet maintenance schedules” [video], YouTube, Dec. 20, 2022, screenshot in 1 page. URL: https://www.youtube.com/watch?v=flUccP-ifaU.
Motive, “Product Brief: Driver Safety”, Motive Technologies, Inc., accessed on Oct. 24, 2023 [publication date unknown], Document No. 2023Q2_1204527735206670, in 4 pages.

(56) References Cited

OTHER PUBLICATIONS

Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6I.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-

(56) References Cited

OTHER PUBLICATIONS

Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Driver I, The Power of Vision, Netradyne, [publication date unknown], in 2 pages.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Introduction Pack", Drivecam, Inc., 2012, in 32 pages. URL: https://www.iae-services.com.au/downloads/DriveCam-Introduction-Pack.pdf.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
"The Home of Actionable Transportation Insights—Meet Altitude", Geotab ITS, accessed on Apr. 1, 2024 [publication date unknown], in 5 pages. URL: https://its.geotab.com/altitude/.

(56) References Cited

OTHER PUBLICATIONS

Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
AutoMotoTV, "Fiat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three-Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf [uploaded in 2 parts].
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.
Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Haworth, N. et al., "The Relationship between Fuel Economy and Safety Outcomes", Monash University, Accident Research Centre, Dec. 2001, Report No. 188, in 67 pages.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.

(56) References Cited

OTHER PUBLICATIONS

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS ONE, Apr. 2017, vol. 12(4): e0174959, in 16 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive, "Guide: AI Model Development", Motive Technologies, Inc., accessed on Mar. 29, 2024 [publication date unknown], Document No. 2022Q1_849898994, in 14 pages.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving" PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No. Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat And AKQA Launch Eco:Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, "LightMetrics ADAS demo" [video], YouTube, Jul. 20, 2017, screenshot in 1 page. URL: https://www.youtube.com/watch?app=desktop&v=9LGz1oo7dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in pp. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I™", NetraDyne, Sep. 22, 2016, in 4 pages URL: https://web.archive.org/web/20160922034006/http://www.netradyne.com/solutions.html.
The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 Biggest Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozS0E.

(56) References Cited

OTHER PUBLICATIONS

Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu. S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

* cited by examiner

CONTEXT-SENSITIVE SAFETY EVENT GENERATION AND PROCESSING FOR VEHICLES

TECHNICAL FIELD

Embodiments of the present disclosure relate to devices, systems, and methods for processing raw events and determining safety events that occur on a vehicle.

BACKGROUND

The approaches described in this section are approaches that could be pursued, but not necessary approaches that have been previously conceived or pursued. Therefore, unless otherwise indicated, it should not be assumed that any of the approaches described in this section quality as prior art merely by virtue of their inclusion in this section.

It can be important to detect events and behaviors during driving that can impact safety. However, there are many challenges in doing so. Processing sensor data from a safety monitoring device without context for events or behaviors can have many false positives or relevant event information can be difficult to find, which can make reviewing safety events challenging and lead to decreased usage of the information provided by the safety monitoring system.

SUMMARY

The systems, methods, and devices described herein each have several aspects, no single one of which is solely responsible for its desirable attributes. Without limiting the scope of this disclosure, several non-limiting features will now be described briefly.

Tracking driver behavior and identifying potential safety issues can be important for ensuring compliance with laws and regulations, reducing accidents, and so forth. Safety monitoring systems can be used to monitor for potential safety issues. Safety monitoring systems can include various monitoring devices, such as driver-facing dashcams, outward-facing dashcams, vehicle gateways (which can monitor, for example, acceleration, braking, turning, and so forth), and the like, which can provide rich data for detecting safety events.

Safety monitoring systems can provide a large amount of information, which can be overwhelming for drivers, safety coaches, and the like, making it difficult and time-consuming for individuals to determine which events are true safety events. This issue can be especially pronounced when there is insufficient context for detected events. For example, harsh braking can indicate a potential safety issue, but at times there can be good reason for harsh braking, such as sudden braking by another driver ahead of the driver, getting cut off by another driver, a crash occurring ahead of the driver, and related to traffic in the vicinity of the vehicle. Similarly, a rapid turn or swerve can indicate a potential safety issue, but in some cases can be a warranted defensive maneuver to avoid an obstacle such as a car that swerves in front of the driver, a child that darts into the street, an icy patch on the road, and so forth. These are merely examples, and many factors can contribute to a driver's behavior. For example obstacles, traffic, inclement weather, road conditions, the behavior of other drivers, and so forth can contribute to a driver's actions.

It can be important to identify safety events accurately and to provide context for safety events. It can be important to collect data that indicates the context for a driver's actions, to consider multiple driver actions in combination, or both. For example, a vehicle gateway can collect information about acceleration, braking, turning, and so forth, and a camera (e.g., a forward-facing and/or rear-facing dashcam) and/or various additional sensors can capture video, audio, and/or other information that indicates the context for the data collected by the vehicle gateway. Such information can be used together to identify true safety events. Additional information can also be used, such as location, weather, whether a truck driven by the driver is loaded or unloaded, and so forth. In some embodiments, such information can come from sensors or other equipment on board the truck, for example a GPS receiver on board the truck. In some embodiments, such information can come from external sources such as weather databases, traffic databases, and/or the like, as discussed in more detail herein.

In some existing approaches to safety event detection, single raw events can be used to determine if a safety event has occurred. For example, sensors on a safety monitoring device (e.g., a vehicle gateway, dash cam, and/or the like) can collect data, and analysis of the raw event can be performed on the device, for example by applying predefined rules, using a machine learning or artificial intelligence model, and so forth. If the on-device processing indicates that a safety event has occurred, data associated with the raw event can be transmitted to a backend server for verification, additional processing, and so forth. In some approaches, raw events can be sent directly to a backend server for processing. In such approaches, one raw event can lead to at most one safety event. Multiple events may not be considered, and contextual information may be non-existent and/or may not be considered in determining that a safety event has occurred. In such an approach, simple rules can determine whether or not a raw event should be identified as a safety event. For example, a rule can require that a threshold acceleration be met in order to create a crash event, that a threshold speed be met in order to create a speeding event, and so forth. Without context, such raw events may be incorrectly identified as safety events. For example, a rapid deceleration may indicate a crash or may indicate a defensive maneuver. A speeding event may lack context about the relevant speed limit, traffic conditions, or other circumstances that may explain why the driver was driving at a particular speed at a particular time.

In addition to a need to correctly identify safety events, it can be important that drivers, safety coaches, and others be able to locate events easily. For example, a driver may remember that a green sedan cut them off, but the driver may not remember exactly when or where it happened, which can make locating the incident difficult and time consuming. Contextual information can be used to facilitate locating such events. For example, computer vision, machine learning (ML), or artificial intelligence (AI) systems can be used to identify objects that are captured by a camera. Thus, for example, a user could search for relevant contextual information for an event. For example, a user could search for green sedans, railroad crossings, bridges, construction zones, and so forth. In some embodiments, a user can perform Boolean searches. For example, if a user is certain that a sedan was involved in an incident but isn't sure if the color was blue or green, the user could search for sedans that were either blue or green. In some embodiments, other search criteria could be used. For example, a user could search for events that occurred while it was raining or snowing, events that occurred at night, and so forth, events that occurred during a morning or evening rush hour, and so forth. Information such as whether it was raining or snowing could be determined, for example, based on video recorded by a dash cam or by retrieving information from a weather database.

Contextual information can be provided in a variety of manners and can come from a variety of sources. In some embodiments, contextual information may originate from raw events. For example, a raw event can include information that provides context for the raw event or for another raw event, such as a previous raw event, a subsequent raw event, or a simultaneous raw event. In some embodiments, contextual information can include video captured by a dashcam (e.g., a forward facing dashcam or a driver facing dashcam). In some embodiments, contextual information can be extracted from a video captured by a dashcam. In some embodiments, contextual information can come from external data sources, such as weather data, traffic data, cell tower location data, Wi-Fi access point location data, traffic camera data, data about the vehicle itself, data about a load state of the vehicle (e.g., whether a trailer is loaded or unloaded) and so forth.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
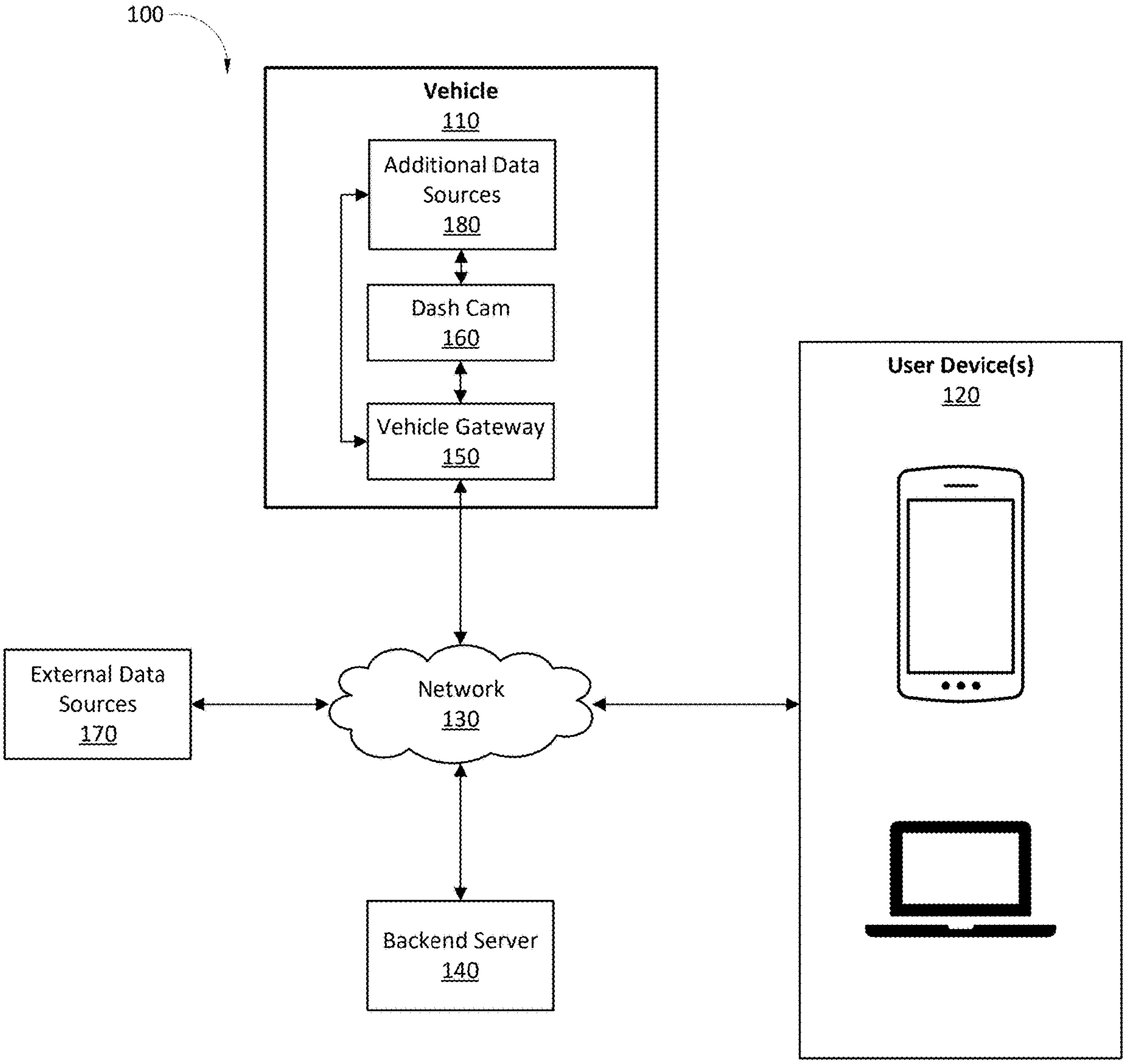
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

A management server (or "backend," "cloud," or "backend server system") can comprise one or more network-accessible servers configured to communicate with various devices, such as vehicle gateways, asset gateways, industrial gateways, and/or other devices. For example, the management server may be configured to communicate with multiple vehicle devices (e.g., via a vehicle gateway and/or communication circuitry of a dashcam), such as each of a fleet of hundreds, thousands, or more vehicles. Similarly, a management server may be configured to communicate with multiple asset devices (e.g., asset gateways) attached to and/or corresponding to respective assets. Thus, the management server may have context and perspective that individual devices do not have. With reference to vehicle devices, for example, the management server may include data associated with a large quantity of vehicles, such as vehicles across a fleet or within a geographic area. Thus, the management server may perform analysis of asset data across multiple vehicles and between groups of vehicles (e.g., comparison of fleets operated by different entities). A backend server system may also include a feedback system that periodically updates event models used by vehicle devices to provide immediate in-vehicle alerts, such as when the backend server has optimized an event model based on analysis of asset data associated with many safety events, potentially across multiple fleets of vehicles.

A vehicle device can include one or more electronic components positioned in or on a vehicle and configured to communicate with a backend server system (also referred to as a "backend" or "cloud"). The backend server system can be a single server or multiple servers, for example multiple physical servers or multiple virtual machines running on one or more physical servers. In some embodiments, different servers may carry out different operations. A vehicle device includes one or more sensors, such as one or more video sensors, audio sensors, accelerometers, global positioning systems (GPS), and the like, which may be housed in a single enclosure (e.g., a dashcam) or multiple enclosures. A vehicle device may include a single enclosure (e.g., a dashcam) that houses multiple sensors as well as communication circuitry configured to transmit sensor data to a backend (or "backend server system"). Alternatively, a vehicle device may include multiple enclosures, such as a dashcam that may be mounted on a front window of a vehicle and a separate vehicle gateway that may be positioned at a different location in the vehicle, such as under the dashboard. In this example implementation, the dashcam may be configured to acquire various sensor data, such as from one or more cameras of the dashcam, and communicate sensor data with the vehicle gateway, which includes communication circuitry configured to communicate with the backend. Vehicle devices also include memory for storing software code that is usable to execute one or more event detection models, such as neural network or other artificial intelligence programming logic, that allow the vehicle device to trigger events without communication with the backend.

A vehicle gateway (or "VG") can include a device positioned in or on a vehicle, which is configured to communicate with one or more sensors in the vehicle, e.g., in a separate dashcam mounted in the vehicle, and to a backend server. In some embodiments, a vehicle gateway can be installed within a vehicle by coupling an interface of the vehicle gateway to an on-board diagnostic (OBD) port of the vehicle. A vehicle gateway may include short-range communication circuitry, such as near field communication ("NFC"), Bluetooth ("BT"), Bluetooth Low Energy ("BLE"), cellular, Wi-Fi, and/or the like, for communicating with sensors in the vehicle and/or other devices that are in proximity to the vehicle (e.g., outside of the vehicle).

An asset gateway (or "AG") can include a device positioned in or on an asset, which is configured to communicate with one or more sensors and/or vehicle gateways. In some embodiments, an asset gateway can be configured to communicate with a backend server. An asset gateway may include short-range communication circuitry, such as near field communication ("NFC"), Bluetooth ("BT"), Bluetooth Low Energy ("BLE"), cellular, Wi-Fi, and/or the like, for communicating with sensors, vehicle gateways, and/or other devices that in proximity to the asset gateway. In some embodiments, an asset gateway may include a GPS receiver for determining the location of the asset gateway. In some embodiments, an asset gateway may include a cellular radio for communicating with a backend server. In some embodiments, a cellular radio may be used to approximate the location of an asset gateway.

A data store can include any computer readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like. Another example of a data store is a hosted storage environment that includes a collection of physical data storage devices that may be remotely accessible and may be rapidly provisioned as needed (commonly referred to as "cloud" storage).

A database can include any data structure (and/or combinations of multiple data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, and/or the like. As used herein, a data source may refer to a table in a relational database, for example.

As discussed briefly above, tracking driver behavior and identifying potential safety issues can be important for ensuring compliance with laws and regulations, reducing accidents, and so forth. Safety monitoring systems can be used to monitor for potential safety issues. Safety monitoring systems can include various monitoring devices, such as driver-facing dashcams, outward-facing dashcams, vehicle gateways (which can monitor, for example, acceleration, braking, turning, and so forth), and the like, which can provide rich data for detecting safety events.

Safety monitoring systems can provide a large amount of information, which can be overwhelming for drivers, safety coaches, and the like, making it difficult and time-consuming for individuals to determine which events are true safety events. This issue can be especially pronounced when there is insufficient context for detected events. For example, harsh braking can indicate a potential safety issue, but at times there can be good reason for harsh braking, such as sudden braking by another driver ahead of the driver, getting cut off by another driver, a crash occurring ahead of the driver, and so forth. Similarly, a rapid turn or swerve can indicate a potential safety issue, but in some cases can be a warranted defensive maneuver to avoid an obstacle such as a car that swerves in front of the driver, a child that darts into the street, an icy patch on the road, and so forth. These are merely examples, and many factors can contribute to a driver's behavior. For example obstacles, traffic, inclement weather, road conditions, the behavior of other drivers, and so forth can contribute to a driver's actions.

It can be important to identify safety events accurately and to provide context for safety events. It can be important to collect data that indicates the context for a driver's actions, to consider multiple driver actions in combination, or both. For example, a vehicle gateway can collect information about acceleration, braking, turning, and so forth, and a camera (e.g., a forward-facing and/or rear-facing dashcam) and/or various additional sensors can capture video, audio, and/or other information that indicates the context for the data collected by the vehicle gateway. Such information can be used together to identify true safety events. Additional information can also be used, such as location, weather, whether a truck driven by the driver is loaded or unloaded, and so forth. In some embodiments, such information can come from sensors or other equipment on board the truck, for example a GPS receiver on board the truck. In some embodiments, such information can come from external sources such as weather databases, traffic databases, and/or the like, as discussed in more detail herein.

In some existing approaches to safety event detection, single raw events can be used to determine if a safety event has occurred. For example, sensors on a safety monitoring device (e.g., a vehicle gateway, dash cam, and/or the like) can collect data, and analysis of the raw event can be performed on the device, for example by applying predefined rules, using a machine learning or artificial intelligence model, and so forth. If the on-device processing indicates that a safety event has occurred, data associated with the raw event can be transmitted to a backend server for verification, additional processing, and so forth. In some approaches, raw events can be sent directly to a backend server for processing. In such approaches, one raw event can lead to at most one safety event. Multiple events may not be considered, and contextual information may be non-existent and/or may not be considered in determining that a safety event has occurred. In such an approach, simple rules can determine whether or not a raw event should be identified as a safety event. For example, a rule can require that a threshold acceleration be met in order to create a crash event, that a threshold speed be met in order to create a speeding event, and so forth. Without context, such raw events may be incorrectly identified as safety events. For example, a rapid deceleration may indicate a crash or may indicate a defensive maneuver. A speeding event may lack context about the relevant speed limit, traffic conditions, or other circumstances that may explain why the driver was driving at a particular speed at a particular time.

In addition to a need to correctly identify safety events, it can be important that drivers, safety coaches, and others be able to locate events easily. For example, a driver may remember that a green sedan cut them off, but the driver may not remember exactly when or where it happened, which can make locating the incident difficult and time consuming. Contextual information can be used to facilitate locating such events. For example, computer vision, machine learning (ML), or artificial intelligence (AI) systems can be used to identify objects that are captured by a camera. Thus, for example, a user could search for relevant contextual information for an event. For example, a user could search for green sedans, railroad crossings, bridges, construction zones, and so forth. In some embodiments, a user can perform Boolean searches. For example, if a user is certain that a sedan was involved in an incident but isn't sure if the color was blue or green, the user could search for sedans that were either blue or green. In some embodiments, other search criteria could be used. For example, a user could search for events that occurred while it was raining or snowing, events that occurred at night, and so forth, events that occurred during a morning or evening rush hour, and so forth. Information such as whether it was raining or snowing could be determined, for example, based on video recorded by a dash cam or by retrieving information from a weather database.

Contextual information can be provided in a variety of manners and can come from a variety of sources. In some embodiments, contextual information may originate from raw events. For example, a raw event can include information that provides context for the raw event or for another raw event, such as a previous raw event, a subsequent raw event, or a simultaneous raw event. In some embodiments, contextual information can include video captured by a dashcam (e.g., a forward facing dashcam or a driver facing dashcam). In some embodiments, contextual information can be extracted from a video captured by a dashcam. In some embodiments, contextual information can come from external data sources, such as weather data, traffic data, cell tower location data, Wi-Fi access point location data, traffic camera data, data about the vehicle itself, data about a load state of the vehicle (e.g., whether a trailer is loaded or unloaded) and so forth.

According to some embodiments, drivers, safety coaches, and others can search events based on multiple criteria. For example, a driver or safety coach may search for video clips of a blue car overtaking the vehicle, and so forth. In some embodiments, users can specify time ranges or other range-based criteria. For example, a user may perform a query for a railroad track crossing that occurred around noon, on Tuesday morning, and so forth.

In some embodiments, a user may be mistaken or may not clearly remember a detail, such as the color of a car that overtook the vehicle. Thus, for example, in some embodiments, a user could perform a fuzzy search. For example, a search for green sedans could also return results showing blue sedans, green sport utility vehicles, and so forth. As another example, a user may remember a partial license plate number. The user can search for the license plate number and fuzzy matching could be used. For example, a driver could be mistaken as to whether a character was "1" or "L," "W" or "V," and so forth. In some cases, a driver may have transposed two characters in a license plate, may have missed a character, and so forth. For example, in the case of string searches (e.g., license plate searches), a system can be configured to return results that are within a particular Levenshtein distance of the string entered by a user. Fuzzy searching can enable the user to retrieve desired search results even if information specified in the search is not correct. In some embodiments, the user may remember a detail correctly, but the information may not be correctly logged. For example, if a license plate number is automatically extracted from a video captured by a dashcam, the extracted license plate number may be incorrect, for example due to blurriness in the image, poor lighting, dirt on the license plate, and so forth. As another example, lighting conditions or poor color calibration can result in the color of a vehicle being misidentified.

According to some embodiments, a safety monitoring system can collect multiple types of information (e.g., video, audio, acceleration, braking, turning) and combine this information to provide a rich view of a trip and any incidents that occurred during the trip. For example, at time one, a safety monitoring system can detect that the vehicle crossed a bridge. At time two, the safety monitoring system can detect that the vehicle overtook another car. The safety monitoring system can record information about, for example, the car's size, color, make, model, license plate, etc., as well as information such as the speed at which the overtaking occurred. At a third time, the safety monitoring system can detect that the vehicle took a left turn. At a fourth time, the safety monitoring system can determine that another car changed lanes and came in front of the vehicle. These events can be combined, for example based on time and/or other metadata, to identify more meaningful events within a trip timeline. The events can be associated with specific times in media such as recorded audio and/or video, thereby enabling easy review of the trip. In some embodiments, a user can search using multiple criteria. For example, a user can search for an overtake that occurred shortly before a railroad crossing.

According to some embodiments, there can be multiple types of events. Not all types of events may be exposed to end users (for example, drivers, safety coaches, customer administrators, and the like). According to some embodiments, there can be raw events, processed/filtered events (which can be, for example, a subset of raw events), pre-safety events, and safety events. Different event types can vary in the source of the event, whether or not contextual data is considered, which rules are applied, and so forth. As discussed in more detail below, safety events can include vendor safety events, which can be defined by a vendor and may not be editable by customers, and customer safety events, which can be defined by customers. A raw event can be collected from a device of a safety monitoring system, such as a dash cam or vehicle gateway. Raw events can be used for event aggregation, context extraction, as input for machine learning models, and so forth. In some embodiments, end users may not have access to raw event data. In various embodiments, a level and/or frequency of raw event generation can be configurable and/or adjustable.

In some embodiments, a raw event can be associated with contextual data, such as geolocation information, cell tower information, Wi-Fi access point information, weather data, traffic data, and so forth. In some embodiments, contextual information can be collected by a device of the safety monitoring system. For example, a safety monitoring device can have a Wi-Fi radio, a cellular radio, a GPS receiver, and so forth. Thus, in some embodiments, the safety monitoring device can report contextual information such as location, nearby access points, nearby cellular transmitters, and so forth. In some embodiments, external data sources can be used. For example, in some embodiments the safety monitoring device can detect nearby cellular transmitters or nearby Wi-Fi access points, and this information can be used to query a database to determine location information. In some embodiments, the location and time of a raw event can be used to determine, for example, weather conditions or traffic conditions at the time of the incident, for example by querying a database that stores weather or traffic information.

Preprocessed/filtered events can be produced by a preprocessing/filtering engine. Preprocessed/filtered events can be used to train a machine learning model and/or to otherwise enrich the raw event data. In some embodiments, end users may not have access to processed/filtered event data. In various embodiments, preprocessed/filtered events can be generated on a safety monitoring device, for example on a dash cam, vehicle gateway, and/or the like. In various embodiments, the handling of raw event data to generate the preprocessed/filtered events can be accomplished by the backend server system. Additionally, preprocessed/filtered events can comprise enriched versions of the raw events, and/or can have an N:1 relationship with the raw events (for example, two or more raw events may be processed into a single preprocessed/filtered event).

In some embodiments, pre-safety events can be provided by a raw event ingestion engine. Pre-safety event data can be used for trip annotation, machine learning model training, and so forth. In some embodiments, the raw event ingestion rule engine can receive as inputs one or more raw events and/or preprocessed/filtered events and can apply pre-safety event rules from a pre-safety event store bag to generate one or more pre-safety events. In some embodiments, the raw event ingestion rule engine may not use contextual data. In some embodiments, end users may not have access to pre-safety event data. In some embodiments, end users may have read-only access to pre-safety event data.

Safety events can be determined by a safety event rule engine. For example, a safety event rule engine can process pre-safety events and contextual information to determine safety events. Safety event data can be used to review safety events, for safety coaching, for AI/ML model training, for providing event alerts, for annotating trips, and so forth. In some embodiments, end users can manipulate safety event data. For example, safety events can be actionable events that an end user can act upon, for example by assigning coaching, adding annotations to the safety event, and so forth. In some embodiments, feedback from users can be used to update AI/ML models used to identify raw events, pre-safety events, and/or safety events. For example, after reviewing a safety event, a user may indicate that the event was not a true safety event. This information can be used to retrain a model so that similar events are less likely to be identified as safety events in the future.

Safety events can include, for example, crashes, harsh acceleration, harsh braking, harsh turning, insufficient following distance (e.g., less than about 1 second from a vehicle directly in front of the vehicle), inattentive driving (e.g., the driver was looking down or at another object such as a smartphone), rolling stops, forward collision warnings (e.g., the driver was dangerously close (e.g., less than five feet) to the vehicle directly in front when the driver came to a stop), failure to yield, drowsy driving, lane departures, delayed responses, mobile device usage, near collisions (e.g., with another vehicle or with a stationary object), failure to wear a seatbelt, speeding, running red lights, or obstructing camera (e.g., obstructing a driver-facing dash-cam and/or a forward-facing dashcam. It will be appreciated that these are merely example safety events, and in practice a safety monitoring system can have more, fewer, and/or different safety events than these examples. Advantageously, according to some embodiments herein, potentially complex rules can be applied to pre-safety events and contextual data to more narrowly define safety events. Accordingly, the number of false safety events can be reduced, and more concerning safety events can be more easily distinguished from less concerning safety events.

According to some embodiments, event ingestion can be dynamically controlled. For example, any addition to or modification of a pre-safety event and/or safety event can be controlled by a "store bag." The store bag can comprise a ruleset to be applied to raw events, pre-safety events, contextual information, etc. In some embodiments, a store bag can be configured in real time. According to some embodiments, raw events can be defined events (e.g., speed, acceleration, following distance, etc.). Raw event ingestion can be defined based on a rule engine, and rules can be injected in real time from the store bags. According to some embodiments, there can be multiple store bags. For example, one store bag can include vendor-provided rules for analyzing raw events to determine any resulting pre-safety events, another can include vendor-provided rules for analyzing pre-safety events and/or contextual information to determine any resulting safety events, and another can provide organization-specific rules (e.g., rules provided by a customer) for analyzing pre-safety events and/or contextual information to determine customer safety events. According to some embodiments, customer safety events may only relate to safety events and not, for example, to pre-safety events. For example, customers may be able to define safety events, but may not be able to define pre-safety events or raw events. In some embodiments, vendor-provided rules can be default rules. In some embodiments, organization-specific rules can override vendor-provided rules.

In some embodiments, one or more models (e.g., AI/ML models, decision trees, and/or the like) can be used as part of a raw event ingestion process. For example, in some embodiments, raw events can be provided to a raw event ingestion rule engine. The raw event ingestion engine can process the raw events and can determine pre-safety events. In some embodiments, metadata may not be used in determining pre-safety events. In some embodiments, the raw event ingestion engine can apply rules from a pre-safety event store bag. The pre-safety event store bag can include one or more rules for processing raw events to determine pre-safety events. In some embodiments, the pre-safety event store bag can be provided by a vendor and may not be accessible or modifiable by an end user.

In some embodiments, pre-safety events and/or contextual information can be used by a safety event rule engine to determine safety events. In some embodiments, the safety event rule engine can be configured to receive contextual information that can provide context for the pre-safety events (e.g., location, weather, traffic, whether a truck is loaded or unloaded, and/or the like). The safety event rule engine can be configured to process pre-safety events and the contextual information to identify safety events.

In some embodiments, the multi-model approach described above can be modified. For example, in some embodiments, a preprocessing/filtering engine may not be used. In some embodiments, a raw event ingestion engine may not be used, and a safety event rule engine can be configured to receive raw event data as an input.

The approach to raw event ingestion and safety event determination described above can enable a wide range of functionality. A safety event can be generated when all of the conditions for a safety event rule are met. In some embodiments, a safety event rule can comprise a single condition. In some embodiments, a safety event rule can comprise multiple conditions. In some embodiments, a safety event rule can be based on one or more pre-safety events alone (e.g., without considering contextual information). In some embodiments, a safety event rule can be based on raw events and contextual information. For example, new safety event rules can be added, existing safety event rules can be modified or removed by a vendor. Customer safety event rules can be added, modified, or removed, and so forth. For example, a customer can define a new customer safety event rule with one or more conditions that can consider one or more pre-safety events and/or contextual information. Advantageously, pre-safety events and/or safety event rules (e.g., vendor safety event rules and/or customer safety event rules) can be added, modified, or removed without build changes, simply by publishing a new or updated set of rules (e.g., a new or updated pre-safety event store bag, vendor safety event store bag, and/or customer safety event store bag).

In some embodiments, any dependency between raw events from a safety monitoring system device and processing that occurs on a backend system can be decoupled. For example, a backend system can receive all raw events detected by a safety monitoring system device, and the backend system can apply relevant rules and models to determine pre-safety events and safety events. In some embodiments, preprocessing/filtering can occur on a safety monitoring system device (e.g., vehicle gateway, dashcam, and/or the like), for example to deduplicate raw events, to drop raw events that are not used to determine pre-safety event events, and so forth, and only a subset of raw events can be uploaded to a backend system. In some embodiments, pre-safety events, safety events, or both can be determined on a device of a safety monitoring system. For example, a dashcam can be configured to receive data from other sources such as a vehicle gateway. In some embodiments, a safety monitoring system device can be configured to run a raw event ingestion engine, a safety event rule engine, or both. In some embodiments, new or modified rules (e.g., a new or modified pre-safety event store bag, vendor safety event store bag, and/or customer safety event store bag) can be pushed to the safety monitoring system device and/or the safety monitoring system device can be configured to communicate with a backend server to determine if new or modified rules are available. On-device processing can have several advantages, such as reduced data usage as less data can be transmitted to a backend server for processing. However, on-device processing can have limitations due to, for example, limited processing power of safety monitoring system devices, intermittent connectivity (which may result in a safety monitoring system device not having the most up-to-date rules), and so forth.

According to some embodiments, the systems and methods described herein can enrich existing safety events or can create new safety events based on raw events, contextual information, pre-safety events, etc. For example, safety event can include contextual information such as a license plate number of a vehicle involved in an accident. The license plate number can be detected shortly before (e.g., within a few seconds, within a few minutes, etc.) of collision detection, after the collision detection, or during the collision detection. For example, in a hit and run accident, the safety monitoring system can detect a collision and capture a license plate number of a nearby vehicle involved in the accident. In some embodiments, the systems and methods herein can enable detection of near misses. For example, a context-sensitive system can detect that a driver's action resulted in a near accident. For example, if a driver moves into the left lane to pass a vehicle and does not notice that there is another vehicle present, the driver may not take actions that would indicate a safety event such as braking or swerving, but a camera may detect that the other vehicle braked or swerved to avoid the driver. Similarly, a camera may provide context for a lane change, for example indicating that there was insufficient open space to perform the maneuver safely. In some embodiments, rich data can be gathered, such as determining a number of lane changes in a time period (e.g., number of lane changes in an hour). In some current approaches, such events may go unnoticed as only single events are considered. Moreover, there may not be anything in a single lane change event that would indicate potentially unsafe behavior. However, a driver who is frequently changing lanes may be driving aggressively or otherwise putting safety at risk. In some embodiments, the systems and methods herein can determine if there was a valid reason for a raw event or pre-safety event such as a harsh brake, such as another vehicle changing lanes shortly before (e.g., within a few seconds before) the harsh brake. In some embodiments, increased speeds, lane changes, harsh turns, harsh braking, and so forth can be correlated with other factors, such as the speed of other cars on the road, overtaking, avoiding debris on the road, and so forth. As discussed above, in some embodiments, end users can create customer safety event rules. For example, an end user can define a customer safety event rule such as a first pre-safety event and a second pre-safety event occurring in a defined time window. For example, a swerve followed by a harsh acceleration may indicate that the driver aggressively overtook another car. End users can combine two, three, four, or more pre-safety events and can specify one or more time periods, a sequence in which pre-safety events must occur, conditions to consider, and so forth, thereby enabling end users to define customer safety event rules with complexity appropriate to identify safety events of interest to the end user. In some embodiments, end users can specify contextual information for a customer safety event rule, as described in more detail herein.

In some embodiments, a user interface can be provided that enables a customer to define customer safety event rules. As mentioned briefly above, safety event rules can be defined in terms of driver actions (e.g., accelerating, turning, braking, etc.) and contextual information (e.g., traffic, weather, etc.). Thus, for example, safety event rules could be defined so that a greater rate of speed is acceptable during daytime, sunny conditions than, for example, at night or when it is raining or snowing. Other information can also be considered when defining safety event rules. For example, a safety event rule might consider a load state of the vehicle, for example whether a vehicle is carrying a load or not or more detailed information such as the weight of a load the vehicle is carrying. For example, a loaded vehicle may have longer stopping distances, in which case the driver should maintain a larger following distance from other vehicles. As another example, an unloaded trailer may be more likely to bounce or otherwise behave unpredictably when encountering adverse conditions such as potholes, high winds, and so forth.

In some cases, there can be conflicts between customer safety event rules and vendor safety even rules. For example, if a customer defines a safety event rule for speeding during rainy weather and there is also a vendor safety event rule for speeding, both could be triggered if a driver is speeding while it is raining. Accordingly, in some embodiments, there can be a need to resolve conflicts between vendor safety event rules and customer safety event rules. In some embodiments, a customer may define two or more safety even rules that potentially conflict with each other, such as a first customer safety event rule for lane departure while distracted and a second customer safety event rule for lane departure while distracted followed by a harsh turn. Such conflicts can result in the same behavior triggering multiple safety events rules, resulting in the generation of multiple safety events.

Accordingly, in some embodiments, a system can be configured to resolve conflicting safety event rules. In some embodiments, the system can be configured to select and apply only the most specific safety event rule associated with the pre-safety events and the contextual information. In some embodiments, the system can be configured to indicate to a user that two or more customer safety event rules conflict, enabling the user to modify one or more customer safety events to resolve the conflict. In some embodiments, the system can be configured such that a customer safety event rule automatically overrides a conflicting vendor safety event rule, and/or vice versa.

The systems and methods described herein can have many advantages. A trip can be defined in terms of detailed events and contextual information, and events and the trip itself can be shown on the same web page. According to some embodiments, a user can view events or request videos (e.g., based on event, time, and so forth) from the same page. In some embodiments, an end user can interact with a trip (e.g., search or request data) based on events. In some embodiments, an end user can view aggregated statistics across a single trip, across multiple trips, across trips on a particular route, and so forth. For example, it can be beneficial to analyze the trips of multiple drivers who have all driven the same route. A driver who is consistently faster than the others may be driving too aggressively. A driver who takes significantly longer than others may be, for example, taking unauthorized breaks or may have difficulty driving the route (for example, the driver may be uncomfortable driving in hilly terrain or in busy urban areas). In some embodiments, trips by a single driver over time can be reviewed. For example, if a driver has started taking much longer or much less time to complete a trip, this may indicate that the driver is taking more breaks or driving more aggressively.

The systems and methods described herein can deliver significant cost savings. For example, mobile data usage (e.g., cellular data usage) can be reduced by reducing or eliminating the need to send videos, hyperlapse videos, or still images, for example by reducing the number of falsely identified safety events for which corresponding video can be uploaded. Storage costs (e.g., cloud storage costs) can be reduced by reducing or eliminating the need to store videos, hyperlapse videos, and/or still images. Computing costs can be reduced. For example, there can be a reduced need to convert image formats, for example from Lepton to JPEG. According to some embodiments, events (e.g., pre-safety events and/or safety events) can be processed on a backend system to create intelligent algorithms that can detect if a time period for a trip contains meaningful information. If so, high resolution video can be retained. If not, high resolution videos can be deleted.

According to some embodiments, a safety score can be improved. For example, drivers can be assigned safety scores based on actions they've taken while driving. With information about the context in which actions were taken, the reasons leading up to the driver's action can be considered. Accordingly, in some embodiments, a driver's safety score can be more reflective of their driving behavior under relevant circumstances, such as traffic, weather, the behavior of other drivers, and so forth. This can build trust in safety scores on the part of both drivers and safety coaches, and can help safety coaches to focus on drivers who may benefit most from coaching.

According to some embodiments herein, a more holistic view of routes, trips, and so forth can be provided. For example, trips on a particular route may have recently started taking longer. With rich contextual information, it may be determined, for example, that such an increase is due to construction along the route or due to driver behavior such as stopping to take breaks. Similarly, unusually short or unusually long trips can be explained based on collected contextual information. For example, a short trip might be explained by unusually light traffic, while an unusually long trip may have been the result of an accident along the route.

EXAMPLE EMBODIMENTS

FIG. 1 illustrates a block diagram of an example operating environment 100 in which one or more aspects of the safety monitoring system of the present disclosure can operate, according to various embodiments. The operating environment 100 can include one or more user devices 120, a backend server 140, one or more vehicles 110, and one or more contextual data sources 170. Each vehicle can be equipped with one or more safety monitoring devices. Such safety monitoring devices can include, for example, a vehicle gateway 150 or a dashcam 160. The various components of the operating environment 100 can communicate with each other via the network 130 as shown. While FIG. 1 depicts a scenario in which the vehicle gateway 150 communicates with other devices over the network 130 and the dashcam 160 communicates with the vehicle gateway 150 but does not communicate directly over the network 130, other configurations are possible. For example, in some embodiments, the dashcam 160 can include communications hardware that enables it to communicate with other devices via the network 130. In general, at least one safety monitoring device of the one or more vehicles 110 can communicate with other devices using the network 130. In some embodiments, safety monitoring devices and other equipment that is associated with the one or more vehicles 110 can communicate with each other via local communications methods such as, for example, Bluetooth, Bluetooth Low Energy, Zigbee, local Wi-Fi networking, and so forth. In some embodiments, contextual data can come from additional data sources 180 that can be located in or on the vehicle 110, such as other sensors, cameras, and so forth. In some embodiments, the additional data sources 180 can be in communication with the dashcam 160 and or the vehicle gateway 150. In some embodiments, the dashcam 160 and/or the vehicle gateway 150 may also be an additional data source 180.

The one or more contextual data sources 170 can include various external data sources such as, for example, a weather database, a traffic database, a database of Wi-Fi access points and their locations, a database of cell towers and their locations, and so forth.

In some embodiments one or more safety monitoring devices (e.g., vehicle gateway 150 and/or dashcam 160) can communicate with one or more contextual data sources 170. For example, a safety monitoring device equipped with cellular or Wi-Fi connectivity can be configured to access one or more contextual data sources 170.

In some embodiments the backend server 140 can communicate with the one or more contextual data sources 170 via the network 130. As described in more detail below, processes running on the backend server 140 can utilize data from the safety monitoring devices (e.g., the vehicle gateway 150, the dashcam 160, and/or the like) and data from the one or more contextual data sources 170 to make various safety-related determinations as described herein.

Figure 2:
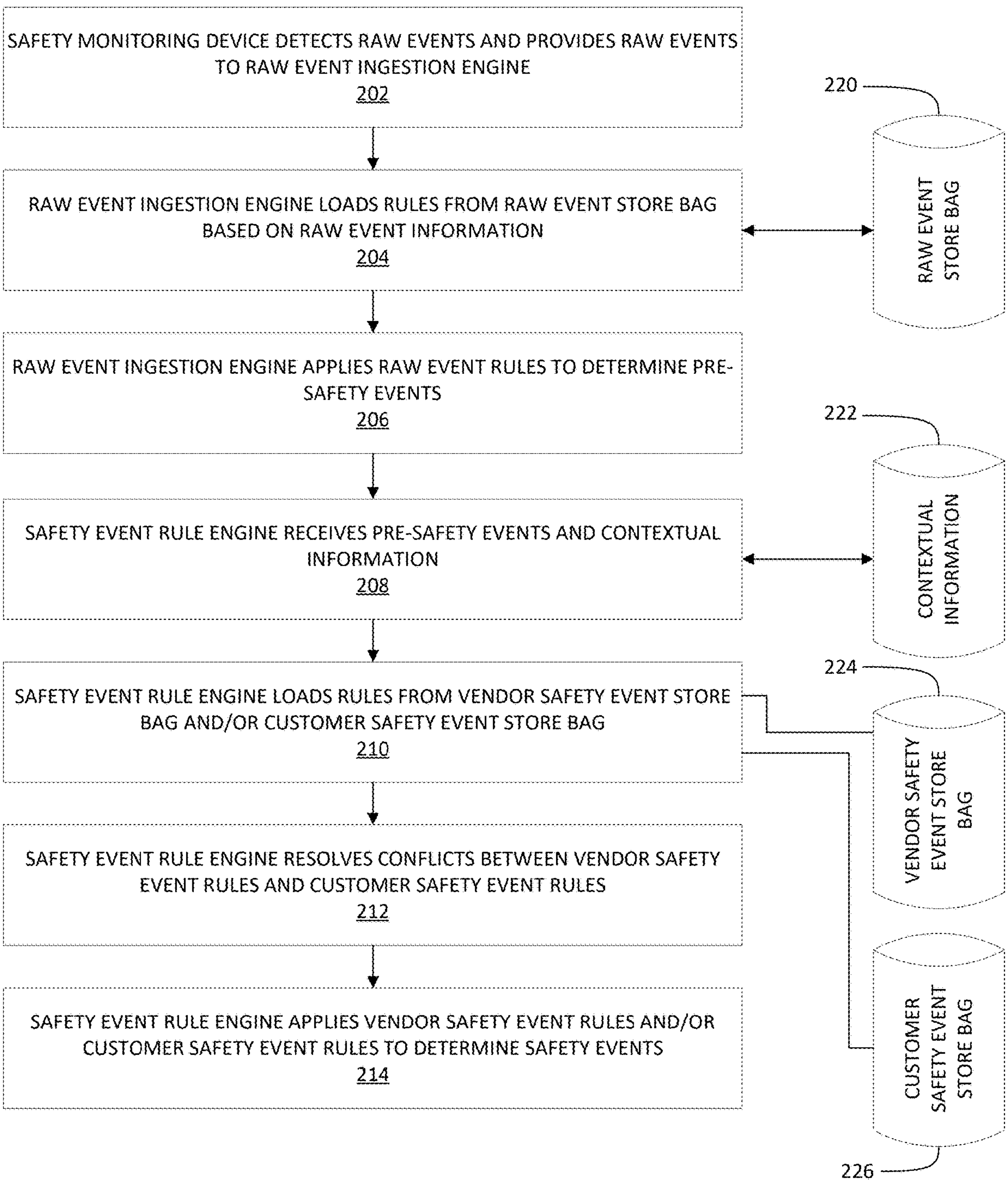
FIG. 2 illustrates a block diagram of an example process for determining safety events according to various embodiments of the present disclosure.

FIG. 2 is a diagram that illustrates an example safety event detection process according to some embodiments. At block 202, a safety monitoring device can detect raw events and can provide the raw events to a raw event ingestion engine. At block 204, the raw event ingestion engine can load one or more raw event rules from a raw event store bag 220 based on information about the raw events (e.g., raw event type, such as speed, harsh acceleration, harsh braking, harsh turning, and so forth). At block 206, the raw event ingestion engine can apply the raw event rules to the raw events to determine pre-safety events. At block 208, a safety event rule engine can receive the pre-safety events and contextual information from contextual information data store 222. The contextual information data store 222 can include information from safety monitoring devices (e.g., vehicle gateways, dashcams, and the like), information from external data sources (e.g., weather data, traffic data, and so forth). In some embodiments, the contextual information data store 222 can be a single data store. In some embodiments, the contextual information data store 222 can comprise multiple data stores. In some embodiments, a contextual information data store 222 can be maintained by a vendor of a safety monitoring system or platform. In some embodiments, a contextual information data store 222 can be an external data source controlled by a third party. In some embodiments, a contextual information data store 222 can be a data source controlled by a customer or user of the safety monitoring system or platform. At block 210, the safety event rule engine can load rules from a vendor safety event store bag 224, a customer safety event store bag 226, or both. At block 212, the safety event rule engine can resolve conflicts between vendor safety event rules and customer safety event rules to select a set of vendor safety event rules and customer safety event rules to apply to the pre-safety events. At block 214, the safety event rule engine can apply vendor safety event rules and customer safety event rules to the pre-safety events and/or the contextual information to determine safety events. For example, the safety event rule engine can determine if all the conditions for a particular safety event rule (e.g., a particular customer safety event rule or a particular vendor safety event rule) are met, in which case the safety event rule engine can generate a safety event. If all the conditions for the particular safety event rule are not met, the safety event rule engine may not generate a safety event. As described herein, a safety event rule can consider pre-safety events. In some embodiments, a safety event rule can consider both pre-safety events and contextual information.

Figure 3:
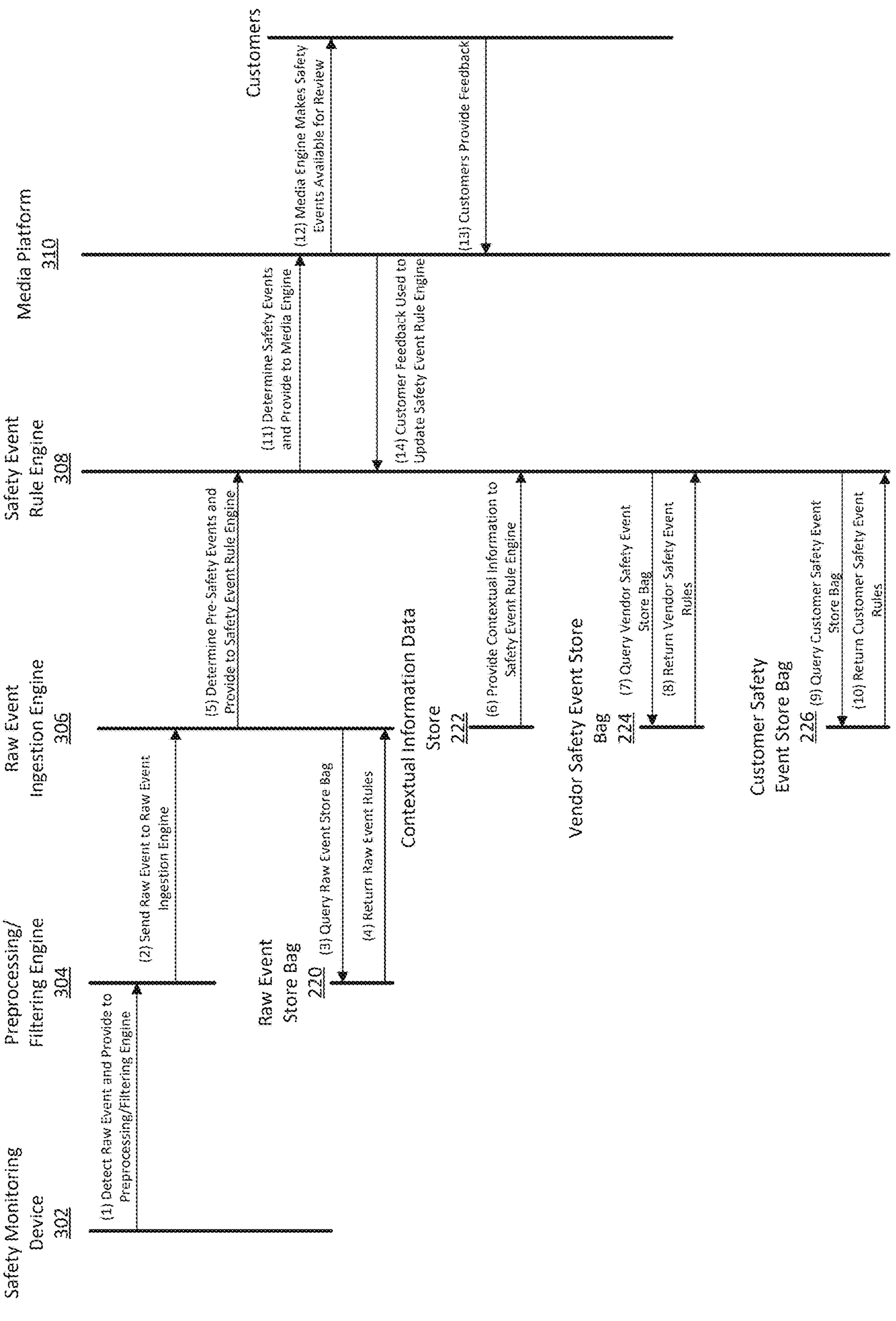
FIG. 3 illustrates another example process for determining safety events according to various embodiments of the present disclosure.

FIG. 3 is a diagram that illustrates an example safety event detection process according to some embodiments. The system can include a safety monitoring device 302, processing/filtering engine 304, raw event ingestion engine 306, raw event store bag 220, safety event rule engine 308, contextual information data store 222, vendor safety event store bag 224, customer safety event store bag 226, and media platform 310. At (1), the safety monitoring device 302 can detect a raw event and provide the raw event data to the processing/filtering engine 304. At (2), the preprocessing/filtering engine 304 can perform initial processing/filtering of the raw event data and can send the processed/filtered raw event information to the raw event ingestion engine 306. In some implementations, the raw event data, in whole or in part, is not processed/filtered, and is sent directly to the raw event ingestion engine. In various implementations, preprocessed/filtered events can comprise enriched versions of the raw events, and/or can have an N:1 relationship with the raw events (for example, two or more raw events may be processed into a single preprocessed/filtered event). At (3), the raw event ingestion engine 306 can query the raw event store bag 220 using information from the raw event provided at (2). At (3), the raw event ingestion engine 306 can receive one or more raw event rules from the raw event store bag 220 to be applied to the raw event (which may comprise, for example, a processed/filtered event) received at (2). At (5), the raw event ingestion engine 306 can apply the raw event rules to the raw and/or processed/filtered event and can determine one or more pre-safety events and the safety event rule engine 308 can receive the pre-safety events. At (6), the contextual information data store 222 can provide contextual information to the safety event rule engine 308. At (7) and (9), the safety event rule engine 308 can query the vendor safety event store bag 224 and customer safety event store bag 226, respectively, using the pre-safety events, the contextual information, or both, to select relevant rules. At (8) and (10) the safety event rule engine 308 can receive vendor safety event rules and customer safety event rules, respectively. At (11), the safety event rule engine 308 can determine safety events, which can be provided to media platform 310. At (12), the media platform 310 can make the safety events available for review by customers. At (13) customers can provide feedback regarding the safety events, which can be used to update the safety event rules engine at (14).

Figure 4:
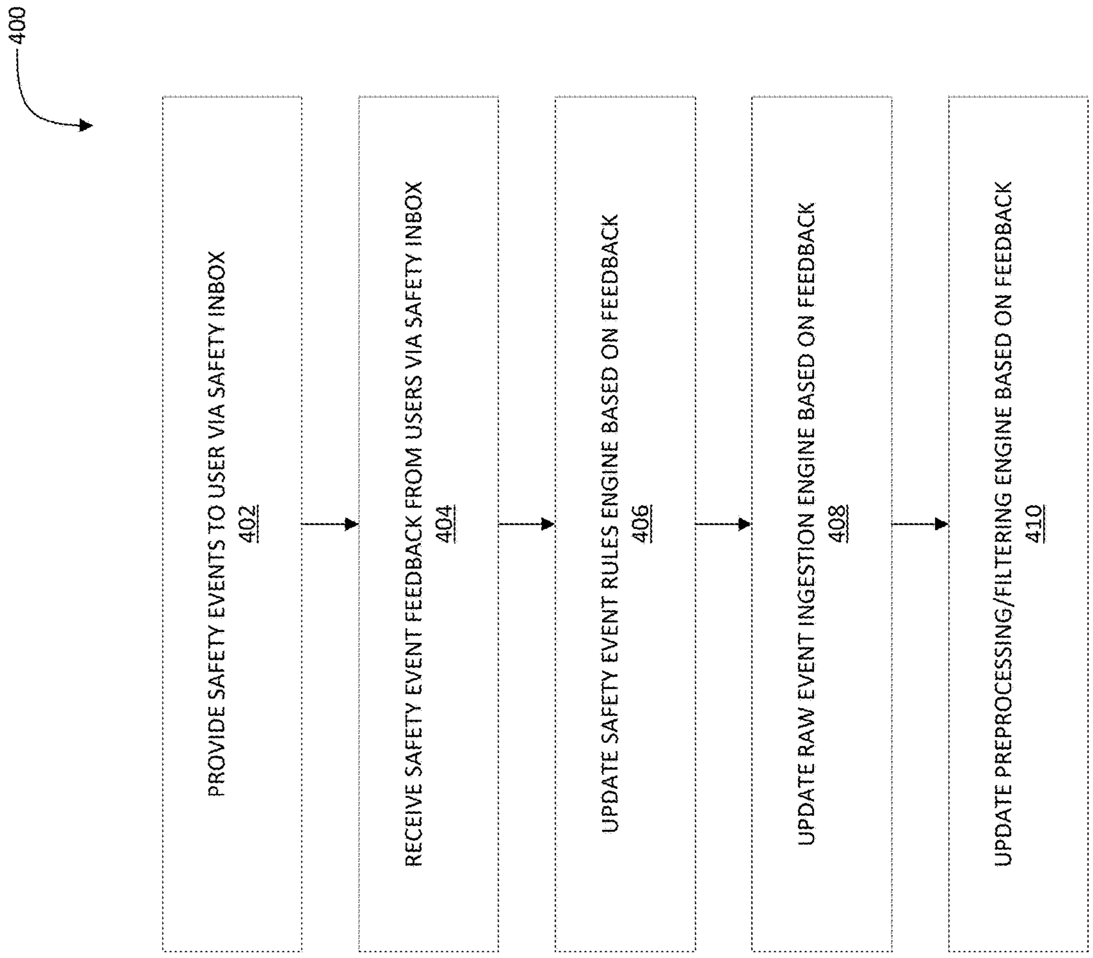
FIG. 4 illustrates a block diagram of an example process for providing safety events to users and receiving user feedback regarding safety events according to various embodiments of the present disclosure.

FIG. 4 is a flow chart that illustrates an example process 400 for providing safety events (e.g., vendor safety events and/or customer safety events) to users, receiving safety event feedback, and updating one or more models based on the received feedback. The process shown in FIG. 4 can be executed on a computer system. At block 402, the computer system can provide safety events to a user via a safety inbox, as described in more detail herein. For example, the safety inbox can be provided in the form of a web site, mobile application, tablet application, desktop application, and/or the like. At block 404, the computer system can receive safety event feedback from the user via the safety inbox. For example, a user can review a safety event and can indicate that the event was a real event or that the event was a false detection. At block 406, the computer system can update a safety event rules engine based on the feedback. For example, the system can update a model of the safety event rules engine based on the received feedback. At block 408, the system can update a raw event ingestion engine based on the feedback. At block 410, the system can update a preprocessing/filtering engine based on the received feedback.

In some embodiments, updating the safety event rules engine, the raw event ingestion engine, and/or the preprocessing/filtering engine can include updating one or more models associated with an engine. In some embodiments, one or more rules (e.g., rules for raw events, pre-safety events, vendor safety events, and/or customer safety events), engines, and/or models, can be updated. For example, if a customer has defined a customer safety event rule for rolling stops that triggers if a minimum speed at a stop sign is greater than 1 mph, but user feedback indicates that rolling stops at speeds greater than the minimum speed are not true safety events, the system can update the customer safety event rule, engine, and/or model, to define a greater minimum speed. For example, the system could update the customer safety event rule so that a safety event is triggered if the minimum speed at a stop sign is greater than 5 mph. Continuing with the rolling stop example, if user feedback indicates that different rolling stop speeds are acceptable under different conditions, the system can automatically update the customer safety event rule to account for different conditions. For example, during clear, daytime conditions, the system can set the minimum speed to 5 mph, while at night or in adverse weather, the system can set the minimum speed to 1 mph. In some embodiments, the system can make updates automatically. In some embodiments, users can be prompted to accept or reject changes proposed by the system.

In some embodiments, a safety monitoring device can include a raw event model, raw event rules, and/or the like that can be used in detecting and/or determining raw safety events. In some embodiments, the raw event model, raw event rules, and so forth of the safety monitoring device can be updated based on user feedback. For example, user feedback may indicate that the safety monitoring device is configured to be too sensitive or not sensitive enough to changes in direction, acceleration, velocity, speed, and so forth. The safety monitoring device can be updated to mitigate or eliminate such over- or under-sensitivity.

In various embodiments, the safety event rules engine, the raw event ingestion engine, and/or the preprocessing/filtering engine can be located in various components of the system. For example, each of the safety event rules engine, the raw event ingestion engine, and the preprocessing/filtering engine may be located on the backend server, may be located on the safety monitoring device, and/or may be located on both the backend server and the safety monitoring device in any combination.

Figure 5A:
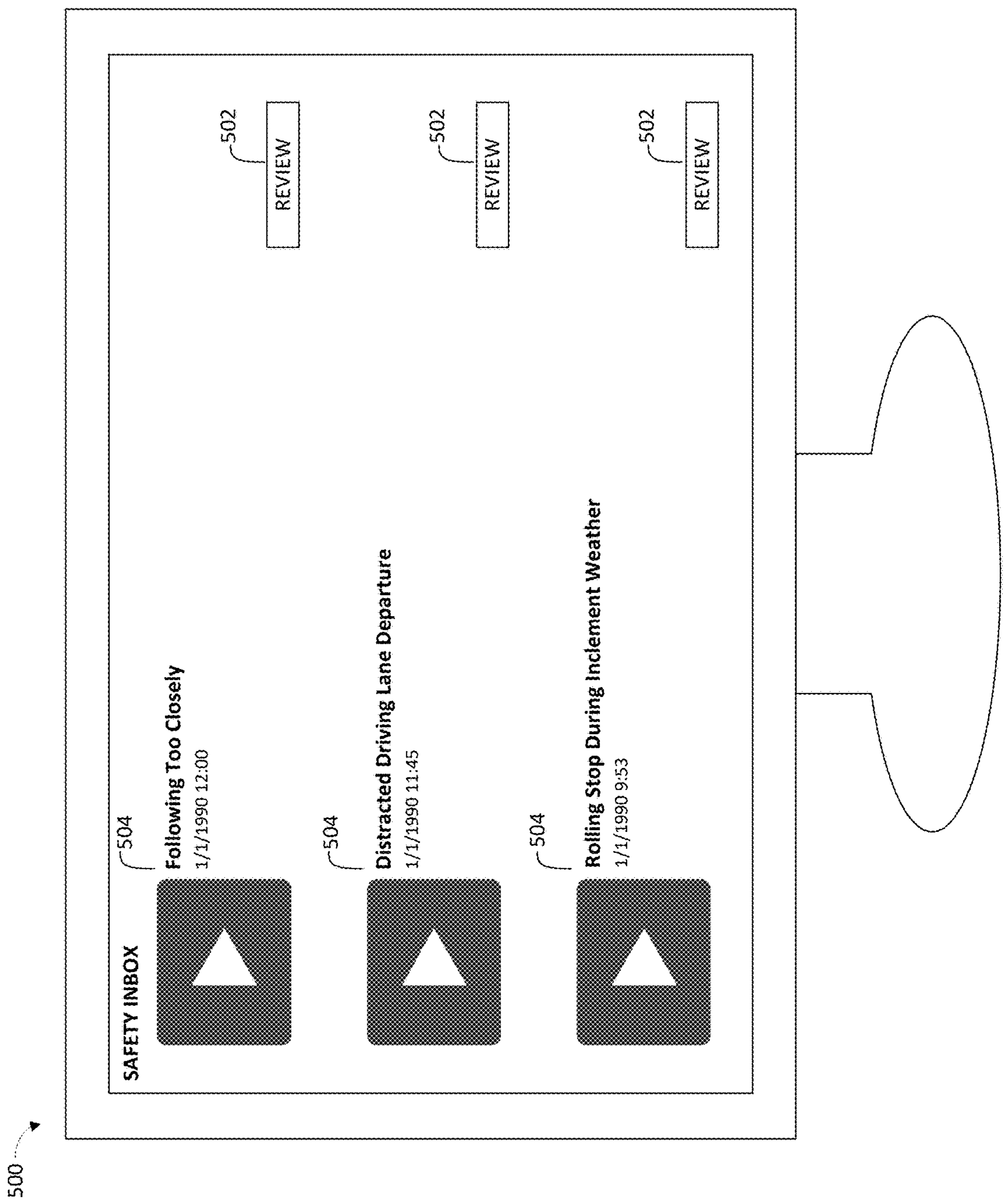
FIGS. 5A-5B illustrate example user interfaces for a safety inbox that can be used to provide safety event feedback according to various embodiments of the present disclosure.
Figure 5B:
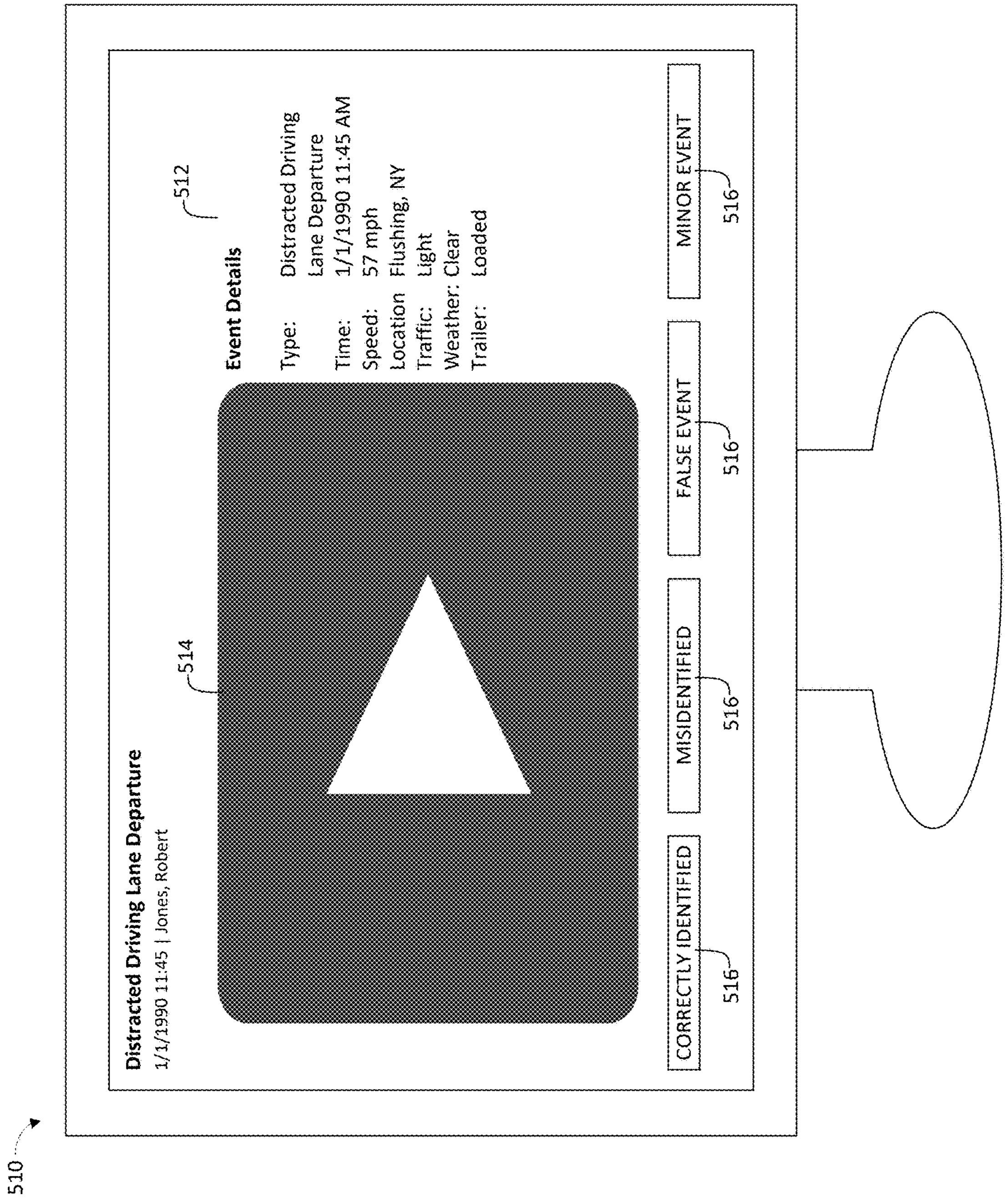

FIGS. 5A and 5B illustrate safety inbox user interfaces 500 and 510 that can be used to review safety events via a computing device (e.g., a smartphone, tablet, laptop, desktop, and/or the like). The interface 500 can present a safety inbox that shows a list of safety events that can be reviewed by a user (e.g., a driver, safety coach, or the like). The list of events can include buttons 502 that can be used to access a safety event for further review and feedback. In some embodiments, instead of buttons, the interface 500 can, for example, hyperlinks. In some embodiments, there may not be a separate button or hyperlink to review a safety event. For example, each safety event can include a description 504 that indicates the type of safety event (e.g., speeding, following too closely, harsh braking, distracted driving, and so forth). In some embodiments, a user can click a description 504 to view details of the safety event, to provide feedback, and so forth. In some embodiments, the description 504 can include safety event information such as the date of the safety event, time of the safety event, location of the safety event, name of the driver, and so forth. In some embodiments, the description 504 can include a thumbnail image or thumbnail video preview associated with the safety event.

As shown in FIG. 5B, the interface 510 can include event details 512, a video view 514, and feedback buttons 516. In some embodiments, additional, fewer, and/or different interface elements can be included in the illustrated safety inbox user interface 510. The event details 512 can include details of the event, such as the type of the event, time of the event, speed, location, traffic conditions, weather conditions, whether or not the trailer was loaded, and so forth. In some embodiments, additional or different contextual information can be included. For example, the event details 512 can include that the driver had recently passed another vehicle, was driving through a construction zone, was cut off by another vehicle, and so forth, as described in more detail throughout this application. The video view 514 can be used to display one or more videos associated with the safety event. For example, the video view 514 can be used to show video of a driver-facing dash cam, a forward-facing dash cam, video from another camera mounted on the vehicle (e.g., on the truck or on the trailer), and so forth. In some embodiments, the video view 514 can be used to view videos from external sources, such as, for example, traffic cameras, red light cameras, and so forth. In some embodiments, the video view 514 can be used to view media other than videos. For example, the video view 514 can be used to review still photos associated with the safety event. Users can utilize the feedback buttons 516 to provide feedback regarding the safety event. For example, the feedback buttons 516 can be used to provide feedback that the safety was correctly identified, was misidentified (e.g., a safety event occurred but the event is incorrectly identified), was a false event (e.g., there was no safety event), or was a minor event.

As described above with reference to FIG. 4, the feedback can be used to update one or more engines used to identify safety events, pre-safety events, and/or raw events. The feedback can also be used in other contexts in addition to or alternatively to updating models used to identify safety events, such as for updating a model for determining driver safety scores.

Figure 6A:
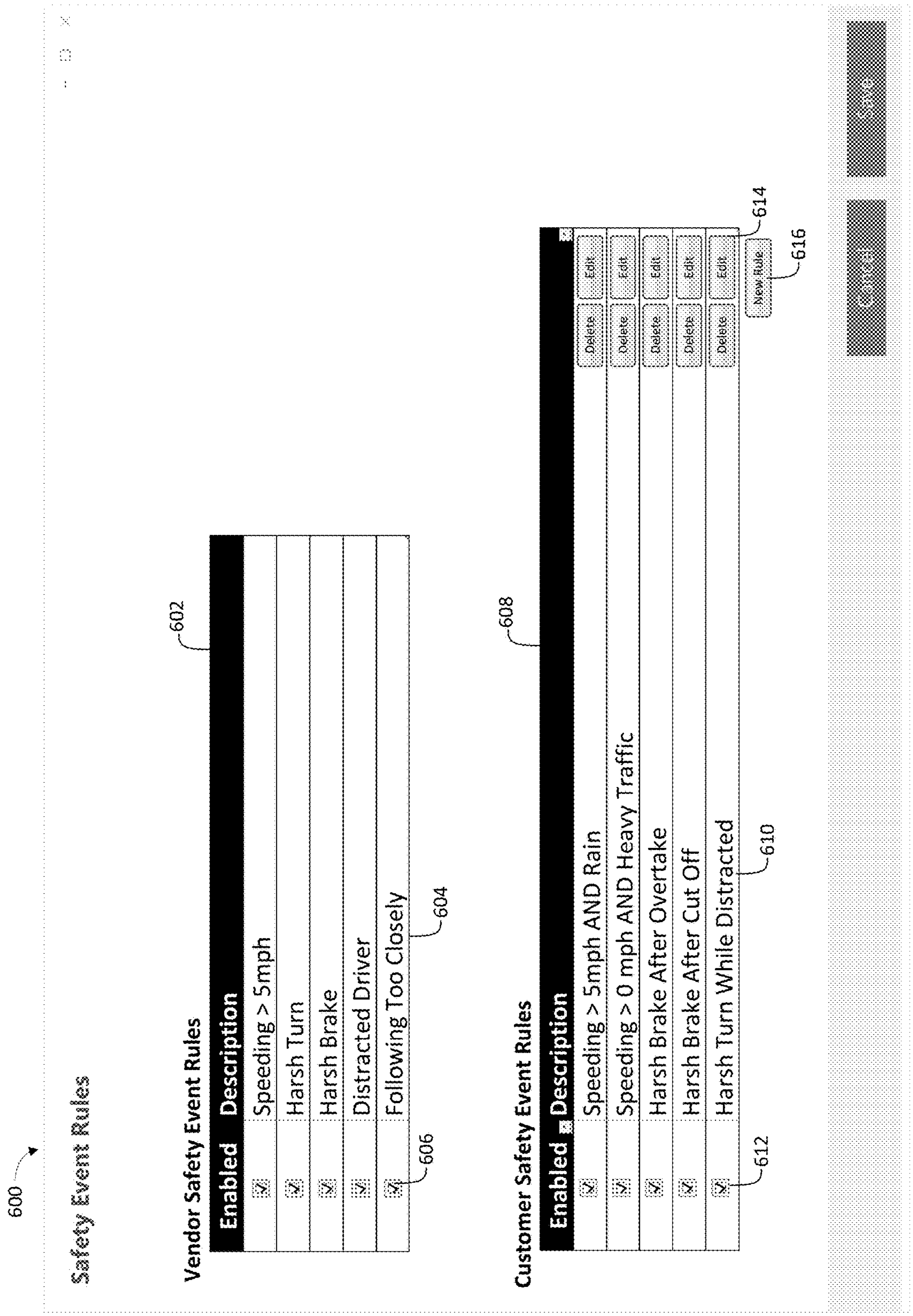
FIGS. 6A-6C illustrate example user interfaces for managing and creating customer safety event rules according to various embodiments of the present disclosure.
Figure 6B:
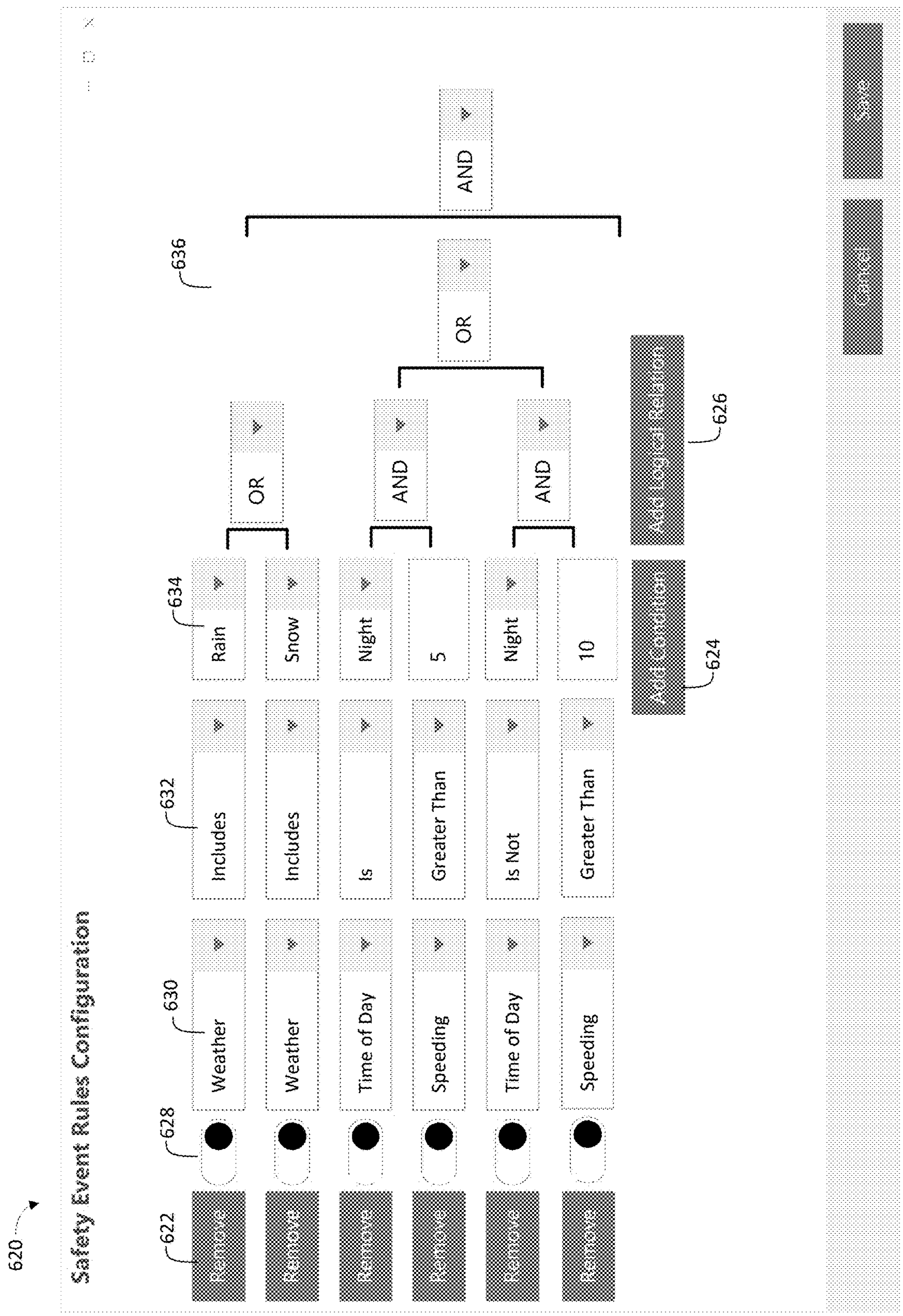
Figure 6C:
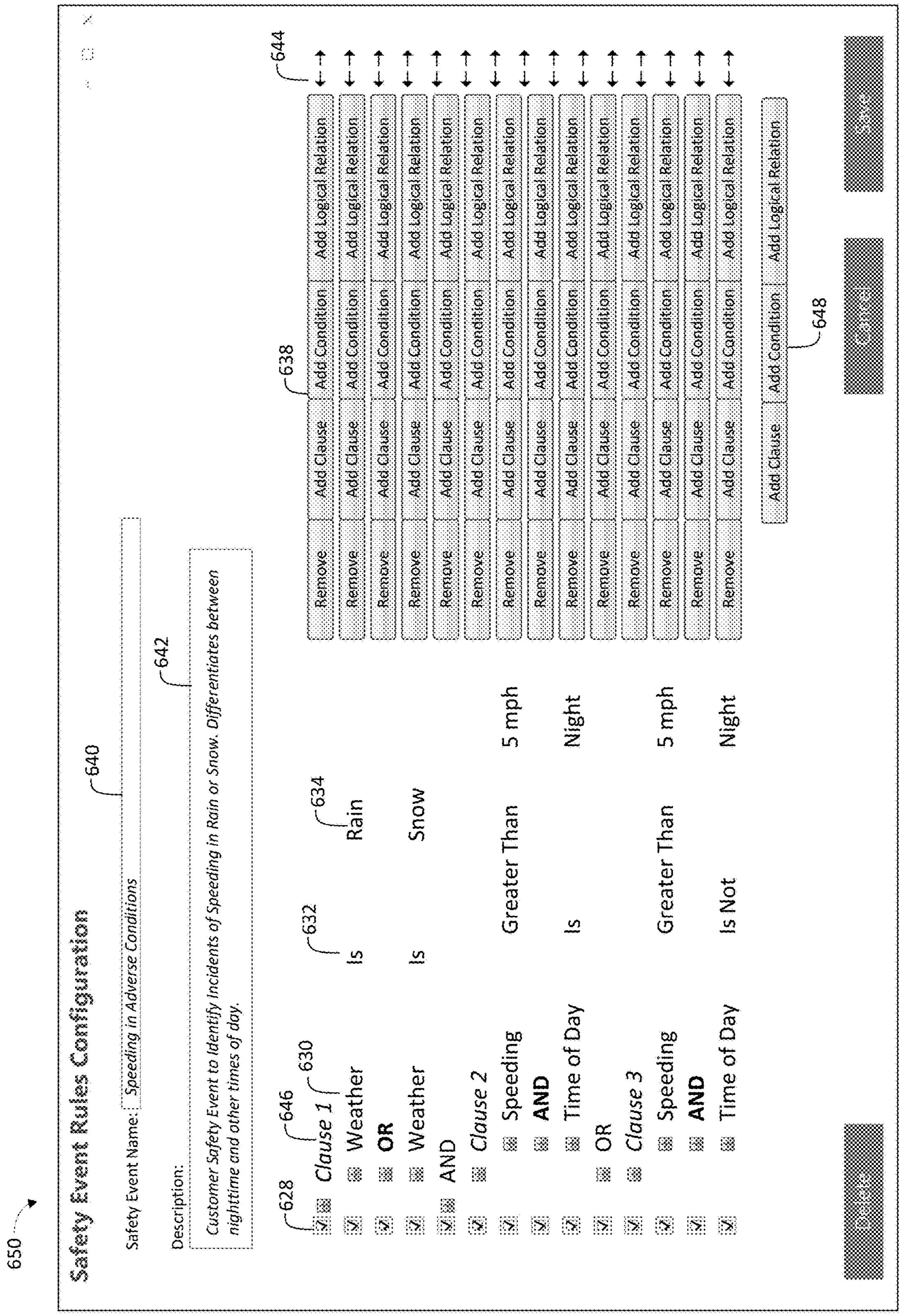

As discussed above, in some embodiments, customers can create custom safety event rules. Custom safety event rules can be based on pre-safety events, contextual information, or both. In some embodiments, a user interface can be provided to enable users to create and/or configure safety event rules. FIGS. 6A-6C illustrate interfaces 600, 620, and 650 that can be used to configure safety event rules. As shown in FIG. 6A, an interface 600 can include a list of vendor safety event rules 602. The list of vendor safety event rules 602 can include vendor safety event rule descriptions 604. In some embodiments, the list of vendor safety event rules 602 can include checkboxes 606 that enable a user to enable or disable individual vendor safety event rules. The interface 600 can include a list of customer safety event rules 608. The list of customer safety event rules can include customer safety event rule descriptions 610. In some embodiments, a description can be automatically generated, for example based on the pre-safety events and/or contextual information used to define the customer safety event rule. In some embodiments, a user can specify a description for a customer safety event rule. Checkboxes 612 can enable a user to enable or disable individual customer safety event rules. For example, a user may wish to keep a customer safety event rule but may not wish to deploy the customer safety event rule, for example because the customer safety event rule is still undergoing development or testing. In some embodiments, a user interface can be configured to enable a customer to active or deactivate rules on a subset of safety monitoring systems under the customer's control. For example, a customer may wish to deploy a safety event rule (e.g., a customer safety event rule or a vendor safety event rule) only on vehicles that travel certain types of routes (e.g., long haul, urban, etc.). in some cases, a customer may deploy a customer safety event rule on a limited number of vehicles for testing prior to deploying the customer safety event rule to the customer's fleet. In some embodiments, the interface 600 can include buttons 614 that can enable a user to delete or edit customer safety event rules. The interface can include a button 616 that can be clicked by a user to create a new customer safety event rule.

The interface 600 is merely exemplary, and the skilled artisan will appreciate that such functionality can be implemented in a variety of different ways. For example, in some embodiments, an option to delete a customer safety event rule may not appear until a user selects an option in the interface to allow deleting of customer safety event rules. In some embodiments, rules configuration can be facilitated using a native graphical application, a web-based interface, a mobile application, a command line interface, and so forth.

FIG. 6B illustrates an example safety event rules configuration interface 620 according to some embodiments. The interface 620 can be used to define customer safety event rules. As shown in FIG. 6B, the interface 620 can include buttons 622 that can be used to remove conditions. The interface 620 can include a button 624 for adding a condition. The interface 620 can include a button 626 for adding a logical relation between conditions. The interface can include toggles 628 that allow a user to enable or disable particular conditions. For example, a user who is developing a new customer safety event rule may not wish to enable all conditions at first. As another example, the user may wish to disable certain conditions in response to seeing how the customer safety event rule behaves when deployed.

As shown in FIG. 6B, the interface 620 can be used to define relatively complex customer safety event rules. The interface can include dropdowns 630 that enable the user to select a pre-safety event, contextual information, and so forth. The interface can include dropdowns 632 for defining features related to the pre-safety event or the contextual information. For example and without limitation, relations can include is, is not, equals, not equal to, greater than, less than, includes, does not include, and so forth. Inputs 634 can be used to set a value for the condition. In some cases, an input 634 can be a dropdown list that allows the users to select from a pre-populated list (e.g., Rain, Snow, Sleet, Fog, Clear; Morning, Afternoon, Evening, Day Night; Light, Heavy; and so forth). In some cases, an input 634 can be a freeform input, such as a text or numeric field that allows the user to input a value (e.g., a speed, length of time, etc.). In some embodiments, validation rules can be used to check a freeform input, for example to ensure that a number is in an allowed numerical range.

The interface can include logical relations 636 that enable the user to define logical relationships between conditions. In some embodiments, logical relations can become complex, for example if there are many conditions. FIG. 6B illustrates an example of a customer safety event rule having six conditions. The safety event rule illustrated in FIG. 6B can be interpreted as "(Weather includes Rain or Snow) AND ((Time of Day is Night and Speeding Is Greater Than 5 mph) or (Time of Day is not Night and Speeding is Greater than 10 mph)." Thus, for example, the customer safety event rule would be triggered if it's raining and snowing and the driver is either driving more than 5 mph over the speed limit at night or more than 10 mph over the speed limit at a time other than night.

FIG. 6C illustrates an alternative embodiment of a rule creation interface 650. The functionality of the interface 650 can be broadly similar to the functionality of the interface 620 of FIG. 6B. An interface such as the interface 650 can be advantageous especially in the case of relatively complex rules with nested relationships. As shown in FIG. 6C, the interface 650 can include an input field 640 that can be used to define a name for a customer safety event rule. A user can provide a description in the description field 642. The interface 650 can include toggles 628 for enabling or disabling clauses, conditions, or logical relationships. The user can use the buttons 638 to perform actions such as removing a condition, clause, or logical relationship. The user can use the arrows 644 to increase or decrease an indent or nesting level of a condition, clause, or logical relationship. In some embodiments, a clause can be a grouping of logical relations and conditions. In some embodiments, clauses can be embedded inside other clauses. The interface can include clause labels 646. Clauses can help to organize the conditions and logical relations of a customer safety event rule, thereby making it easier for customers to create or modify customer safety event rules. In some embodiments, the user can expand or collapse a clause to show or hide the conditions and logical relations contained therein. As described above, the interface can include dropdowns 630 that enable the user to select a pre-safety event, contextual information, and so forth. The interface can include dropdowns 632 for defining comparative relations related to the pre-safety event or the contextual information. For example and without limitation, relations can include is, is not, equals, not equal to, greater than, less than, includes, does not include, and so forth. Inputs 634 can be used to set a value for the condition. In some cases, an input 634 can be a dropdown menu that allows the users to select from a pre-populated list (e.g., Rain, Snow, Sleet, Fog, Clear; Morning, Afternoon, Evening, Day Night; Light, Heavy; and so forth). An input 634 can be a freeform input, such as a text or numeric field that allows the user to input a value (e.g., a speed, length of time, etc.). As discussed above, in some embodiments, a system can be configured to validate the user input to conform to one or more validation rules. The interface 650 can include buttons 648 that can be used to add clauses, conditions, and/or logical relations.

In various implementations, a user can specify, for example via a safety event rule, that a matching/detected event is not a safety event. For example, by specifying that an event is not a safety event, the system may determine to not generate a safety event, alert, notification, and/or the like.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowcharts and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A computer-implemented method for determining safety events associated with a vehicle comprising: receiving, from at least one safety monitoring device on a vehicle, information indicative of driver safety, the information comprising at least one raw event; receiving contextual information associated with the at least one raw event; selecting, from a raw event store bag based on the at least one raw event, one or more rules to apply to the at least one raw event; applying the one or more rules to the at least one raw event using a raw event ingestion rule engine; determining, via the raw event ingestion rule engine, at least one pre-safety event; selecting, from a vendor safety event store bag, one or more vendor safety event rules to apply to the at least one pre-safety event and the contextual information, the selection based on at least one of the at least one pre-safety event or the contextual information; selecting, from a customer safety event store bag, one or more customer safety event rules to apply to the at least one pre-safety event and the contextual information, the selection based on at least one of the at least one pre-safety event or the contextual information; determining a conflict between at least one customer safety event rule and at least one vendor safety event rule; applying, using a safety event rule engine, the at least one vendor safety event rule and the at least one customer safety event rule to the at least one pre-safety event and the contextual information to determine a safety event, wherein at least one conflicting vendor safety event rule is not applied to the at least one pre-safety event and the contextual information; making available to a user information associated with the safety event via a media platform; receiving feedback from the user via the media platform; and updated the safety event rule engine based on the feedback.

Clause 2. The computer-implemented method of Clause 1, further comprising resolving the conflict between the at least one customer safety event rule and the at least one vendor safety event rule, wherein resolving the conflict comprises at least one of determining to not apply the at least one vendor safety event rule to the at least one pre-safety event and the contextual information or determining not to apply the at least one customer safety event rule to the at least one pre-safety event and the contextual information based on a determination that the at least one customer safety event rule is less specific than the at least one vendor safety event rule.

Clause 3. The computer-implemented method of Clause 1, wherein the contextual information associated with the at least one raw event further comprises data obtained from an external data source.

Clause 4. The computer-implemented method of Clause 3, wherein the external data source comprises one or more of a weather database, a traffic database, a cell tower location database, or a Wi-Fi access point location database.

Clause 5. The computer-implemented method of Clause 1, further comprising updating, based on the feedback, a raw event model of the at least one safety monitoring device. 6.

Clause 6. A computer-implemented method for determining safety events associated with a vehicle comprising: receiving, from at least one safety monitoring device, information indicative of driver safety, the information comprising at least one raw event; receiving contextual information associated with the information indicative of driver safety; processing the at least one raw event to select, from a raw event store bag based on the at least one raw event, one or more rules to apply to the at least one raw event; applying the one or more rules to the at least one raw event using a raw event ingestion rule engine; determining, using the raw event ingestion rule engine, at least one pre-safety event; selecting, from a vendor safety event store bag, one or more vendor safety event rules to apply to the at least one pre-safety event and the contextual information, the selection based on at least one of the at least one pre-safety event or the contextual information; applying, using a safety event rule engine, the one or more vendor safety event rules to the at least one pre-safety event and the contextual information; and determining, using the safety event rule engine, based on the at least one pre-safety event and the contextual information, a safety event.

Clause 7. The computer-implemented method of Clause 6, further comprising: providing the safety event to a media platform, the media platform configured to allow a user to provide feedback relating to the safety event; and receiving, from the user, feedback relating to the safety event.

Clause 8. The computer-implemented method of Clause 7, further comprising: updating the safety event rule engine based on the feedback.

Clause 9. The computer-implemented method of Clause 6, further comprising: selecting, from a customer safety event store bag, one or more customer safety event rules to apply to the at least one pre-safety event and the contextual information, the selection based on at least one of the at least one pre-safety event or the contextual information; and applying, using a safety event rule engine, the one or more customer safety event rules to the at least one pre-safety event and the contextual information.

Clause 10. The computer-implemented method of Clause 9, wherein the selection further comprises: determining that at least one customer safety event rule conflicts with at least one vendor safety event rule; and not selecting the at least one conflicting vendor safety event rule.

Clause 11. The computer-implemented method of Clause 9, wherein the selection further comprises: determining that a first customer safety event rule of the at least one customer safety event rule conflicts with a second customer safety event rule of the at least one customer safety event rule; determining that the first customer safety event rule is more specific than the second customer safety event rule; selecting the first customer safety event rule; and not selecting the second customer safety event rule.

Clause 12. The computer-implemented method of Clause 10, wherein the at least one customer safety event rule comprises at least one condition, wherein the at least one vendor safety event rule comprises at least one condition, wherein determining that at least one customer safety event rule conflicts with at least one vendor event comprises determining the at least one vendor safety event rule comprises all of the at least one condition of the at least one customer safety event rule.

Clause 13. The computer-implemented method of Clause 9, wherein the customer safety event store bag comprises one or more customer safety event rules, the customer safety event rules defined by an end user.

Clause 14. The computer-implemented method of Clause 6, wherein the contextual information comprises one or more of: forward-facing dashcam video, driver-facing dashcam video, weather data, traffic data, or location data.

Clause 15. The computer-implemented method of Clause 6, wherein the received raw events comprise a subset of raw events detected by the at least one safety monitoring device.

Clause 16. The computer-implemented method of Clause 6, wherein the at least one pre-safety event comprises a speed of the vehicle, and wherein the contextual information comprises a weather condition.

Clause 17. The computer-implemented method of Clause 6, wherein the at least one pre-safety event comprises a crash detection for a crash, and wherein the contextual information comprises a license plate number of a vehicle involved in the crash.

Clause 18. The computer-implemented method of Clause 6, wherein the at least one pre-safety event comprises a following distance, and wherein the contextual information comprises a load state of the vehicle.

Clause 19. The computer-implemented method of Clause 6, wherein the at least one pre-safety event comprises harsh braking, and wherein the contextual information comprises information related to traffic in a vicinity of the vehicle.

Clause 20. The computer-implemented method of Clause 6, further comprising: storing a video associated with the safety event on a non-volatile memory of a backend server.

Clause 21. A computer-implemented method for determining safety events associated with a vehicle comprising: receiving, from a safety monitoring device on a vehicle, information indicative of driver safety, the information comprising a raw event; receiving contextual information associated with the raw event; selecting, from a raw event store bag based on the raw event, a rule to apply to the raw event; applying the rule to the raw event using a raw event ingestion rule engine to determine a pre-safety event; selecting a vendor safety event rule and a customer safety event rule to apply to the pre-safety event and the contextual information, the selection based on at least one of the pre-safety event or the contextual information; determining a conflict between the customer safety event rule and the vendor safety event rule; applying, using a safety event rule engine, the customer safety event rule to the pre-safety event and the contextual information to determine a safety event, wherein the conflicting vendor safety event rule is not applied to the pre-safety event and the contextual information; and making available, to a user, information associated with the safety event via a media platform.

Clause 22. The computer-implemented method of Clause 21, further comprising: resolving the conflict between the customer safety event rule and the vendor safety event rule, wherein resolving the conflict comprises at least one of: determining to not apply the vendor safety event rule or customer safety event rule to the pre-safety event and the contextual information, determining not to apply the customer safety event rule to the pre-safety event and the contextual information based on a determination that the customer safety event rule is less specific than the vendor safety event rule, or determining not to apply the vendor safety event rule to the pre-safety event and the contextual information based on a determination that the vendor safety event rule is less specific than the customer safety event rule.

Clause 23. The computer-implemented method of Clause 21, wherein the contextual information associated with the raw event further comprises data obtained from an external data source.

Clause 24. The computer-implemented method of Clause 23, wherein the external data source comprises at least one of: a weather database, a traffic database, a cell tower location database, or a Wi-Fi access point location database.

Clause 25. The computer-implemented method of Clause 21, further comprising: receiving feedback from the user via the media platform; and updating the safety event rule engine based on the feedback.

Clause 26. The computer-implemented method of Clause 25, further comprising: updating, based on the feedback, a raw event model of the safety monitoring device.

Clause 27. A computer-implemented method for determining safety events associated with a vehicle comprising: receiving, from a safety monitoring device, information indicative of driver safety, the information comprising a raw event; receiving contextual information associated with the information indicative of driver safety; processing the raw event to select, from a raw event store bag based on the raw event, a rule to apply to the raw event; applying the rule to the raw event using a raw event ingestion rule engine; determining, using the raw event ingestion rule engine, a pre-safety event; selecting, from a vendor safety event store bag, a vendor safety event rule to apply to the pre-safety event and the contextual information, the selection based on at least one of the pre-safety event or the contextual information; applying, using a safety event rule engine, the vendor safety event rule to the pre-safety event and the contextual information; and determining, using the safety event rule engine, based on the pre-safety event and the contextual information, a safety event.

Clause 28. The computer-implemented method of Clause 27, further comprising: providing the safety event to a media platform, the media platform configured to allow a user to provide feedback relating to the safety event; and receiving, from the user, feedback relating to the safety event.

Clause 29. The computer-implemented method of Clause 28, further comprising: updating the safety event rule engine based on the feedback.

Clause 30. The computer-implemented method of Clause 27, further comprising: selecting, from a customer safety event store bag, a customer safety event rule to apply to the pre-safety event and the contextual information, the selection based on at least one of: the pre-safety event or the contextual information; and applying, using a safety event rule engine, the customer safety event rule to the pre-safety event and the contextual information.

Clause 31. The computer-implemented method of Clause 30, wherein the selection further comprises: determining that a customer safety event rule conflicts with a vendor safety event rule; and not selecting the conflicting vendor safety event rule.

Clause 32. The computer-implemented method of Clause 31, wherein the customer safety event rule comprises a condition, wherein the vendor safety event rule comprises a condition, and wherein determining that the customer safety event rule conflicts with the vendor event comprises determining the vendor safety event rule comprises the condition of the at least one customer safety event rule.

Clause 33. The computer-implemented method of Clause 30, wherein the selection further comprises: determining that a first customer safety event rule conflicts with a second customer safety event rule; determining that the first customer safety event rule is more specific than the second customer safety event rule; selecting the first customer safety event rule; and not selecting the second customer safety event rule.

Clause 34. The computer-implemented method of Clause 30, wherein the customer safety event store bag comprises a customer safety event rule, the customer safety event rule defined by an end user.

Clause 35. The computer-implemented method of Clause 27, wherein the contextual information comprises at least one of: forward-facing dashcam video, driver-facing dashcam video, weather data, traffic data, or location data.

Clause 36. The computer-implemented method of Clause 27, wherein the pre-safety event comprises a speed of the vehicle, and wherein the contextual information comprises a weather condition.

Clause 37. The computer-implemented method of Clause 27, wherein the pre-safety event comprises a crash detection for a crash, and wherein the contextual information comprises a license plate number of a vehicle involved in the crash.

Clause 38. The computer-implemented method of Clause 27, wherein the pre-safety event comprises a following distance, and wherein the contextual information comprises a load state of the vehicle.

Clause 39. The computer-implemented method of Clause 27, wherein the pre-safety event comprises harsh braking, and wherein the contextual information comprises information related to traffic in a vicinity of the vehicle.

Clause 40. The computer-implemented method of Clause 27, further comprising: storing a video associated with the safety event on a non-volatile memory of a backend server.

Clause 41. A system comprising: a computer readable storage medium having program instructions embodied therewith; and one or more processors configured to execute the program instructions to cause the system to perform the computer implemented method of any of Clauses 1-40.

Clause 42. A computer program product comprising a computer readable storage medium having program instructions embodied therewith, the program instructions executable by one or more processors to cause the one or more processors to perform the computer implemented method of any of Clauses 1-40.

What is claimed is:

1. A computer-implemented method for determining safety events associated with a vehicle comprising:

communicating, by a server computing device, with a safety monitoring device on a vehicle, wherein the safety monitoring device comprises at least a dashcam, and wherein the safety monitoring device is configured to execute a raw event model;

receiving, by the server computing device and from the safety monitoring device, information indicative of driver safety, the information comprising a raw event;

receiving, by the server computing device, contextual information associated with the raw event;

selecting, from a raw event store bag based on the raw event, a rule to apply to the raw event;

applying the rule to the raw event using a raw event ingestion rule engine to determine a pre-safety event;

selecting a vendor safety event rule and a customer safety event rule to apply to the pre-safety event and the contextual information, the selection based on at least one of the pre-safety event or the contextual information;

determining a conflict between the customer safety event rule and the vendor safety event rule;

applying, using a safety event rule engine, the customer safety event rule to the pre-safety event and the contextual information to determine a safety event, wherein the conflicting vendor safety event rule is not applied to the pre-safety event and the contextual information;

making available, to a user, information associated with the safety event via a media platform;

updating, based at least in part on feedback received from the user, the raw event model; and communicating, by the server computing device, the updated raw event model to the safety monitoring device, wherein the safety monitoring device is configured to execute the updated raw event model.

2. The computer-implemented method of claim 1, further comprising:

resolving the conflict between the customer safety event rule and the vendor safety event rule, wherein resolving the conflict comprises at least one of: determining to not apply the vendor safety event rule or customer safety event rule to the pre-safety event and the contextual information, determining not to apply the customer safety event rule to the pre-safety event and the contextual information based on a determination that the customer safety event rule is less specific than the vendor safety event rule, or determining not to apply the vendor safety event rule to the pre-safety event and the contextual information based on a determination that the vendor safety event rule is less specific than the customer safety event rule.

3. The computer-implemented method of claim 1, wherein the contextual information associated with the raw event further comprises data obtained from an external data source.

4. The computer-implemented method of claim 3, wherein the external data source comprises at least one of: a weather database, a traffic database, a cell tower location database, or a Wi-Fi access point location database.

5. The computer-implemented method of claim 1, further comprising:

receiving feedback from the user via the media platform; and updating the safety event rule engine based on the feedback.

6. A computer-implemented method for determining safety events associated with a vehicle comprising:

communicating, by a server computing device, with a safety monitoring device on a vehicle, wherein the safety monitoring device comprises at least a dashcam, and wherein the safety monitoring device is configured to execute a raw event model;

receiving, from a safety monitoring device, information indicative of driver safety, the information comprising a raw event;

receiving contextual information associated with the information indicative of driver safety;

processing the raw event to select, from a raw event store bag based on the raw event, a rule to apply to the raw event;

applying the rule to the raw event using a raw event ingestion rule engine;

determining, using the raw event ingestion rule engine, a pre-safety event;

selecting, from a vendor safety event store bag, a vendor safety event rule to apply to the pre-safety event and the contextual information, the selection based on at least one of the pre-safety event or the contextual information;

applying, using a safety event rule engine, the vendor safety event rule to the pre-safety event and the contextual information;

determining, using the safety event rule engine, based on the pre-safety event and the contextual information, a safety event;

updating, based at least in part on feedback received from a user, the raw event model; and communicating, by the server computing device, the updated raw event model to the safety monitoring device, wherein the safety monitoring device is configured to execute the updated raw event model.

7. The computer-implemented method of claim 6, further comprising:

providing the safety event to a media platform, the media platform configured to allow a user to provide feedback relating to the safety event; and receiving, from the user, feedback relating to the safety event.

8. The computer-implemented method of claim 7, further comprising:

updating the safety event rule engine based on the feedback.

9. The computer-implemented method of claim 6, further comprising:

selecting, from a customer safety event store bag, a customer safety event rule to apply to the pre-safety event and the contextual information, the selection based on at least one of: the pre-safety event or the contextual information; and applying, using a safety event rule engine, the customer safety event rule to the pre-safety event and the contextual information.

10. The computer-implemented method of claim 9, wherein the selection further comprises:

determining that a customer safety event rule conflicts with a vendor safety event rule; and not selecting the conflicting vendor safety event rule.

11. The computer-implemented method of claim 10, wherein the customer safety event rule comprises a condition, wherein the vendor safety event rule comprises a condition, and wherein determining that the customer safety event rule conflicts with the vendor event comprises determining the vendor safety event rule comprises the condition of the at least one customer safety event rule.

12. The computer-implemented method of claim 9, wherein the selection further comprises:

determining that a first customer safety event rule conflicts with a second customer safety event rule;

determining that the first customer safety event rule is more specific than the second customer safety event rule;

selecting the first customer safety event rule; and not selecting the second customer safety event rule.

13. The computer-implemented method of claim 9, wherein the customer safety event store bag comprises a customer safety event rule, the customer safety event rule defined by an end user.

14. The computer-implemented method of claim 6, wherein the contextual information comprises at least one of: forward-facing dashcam video, driver-facing dashcam video, weather data, traffic data, or location data.

15. The computer-implemented method of claim 6, wherein the pre-safety event comprises a speed of the vehicle, and wherein the contextual information comprises a weather condition.

16. The computer-implemented method of claim 6, wherein the pre-safety event comprises a crash detection for a crash, and wherein the contextual information comprises a license plate number of a vehicle involved in the crash.

17. The computer-implemented method of claim 6, wherein the pre-safety event comprises a following distance, and wherein the contextual information comprises a load state of the vehicle.

18. The computer-implemented method of claim 6, wherein the pre-safety event comprises harsh braking, and wherein the contextual information comprises information related to traffic in a vicinity of the vehicle.

19. The computer-implemented method of claim 6, further comprising:

storing a video associated with the safety event on a non-volatile memory of a backend server.

* * * * *